US012526264B1

(12) United States Patent
Bethancourt et al.

(10) Patent No.: US 12,526,264 B1
(45) Date of Patent: Jan. 13, 2026

(54) MACHINE LEARNING BASED AUTHENTICATION PLATFORM

(71) Applicant: Forward Lending, Inc., Austin, TX (US)

(72) Inventors: Jose Bethancourt, Austin, TX (US); Jesus Marco del Carmen, Austin, TX (US); Mustafa Ali, Austin, TX (US); Christopher Ayre Boggs, Austin, TX (US); Mit Shah, Chevy Chase, MD (US)

(73) Assignee: Forward Lending, Inc., Austin, TX (US)

( * ) Notice: Subject to any disclaimer, the term of this patent is extended or adjusted under 35 U.S.C. 154(b) by 125 days.

(21) Appl. No.: 18/509,171

(22) Filed: Nov. 14, 2023

Related U.S. Application Data

(60) Provisional application No. 63/533,468, filed on Aug. 18, 2023.

(51) Int. Cl.
*G06F 21/00* (2013.01)
*H04L 9/40* (2022.01)

(52) U.S. Cl.
CPC .................................... *H04L 63/08* (2013.01)

(58) Field of Classification Search
USPC .................. 726/3, 4, 22, 23, 25; 705/26, 41
See application file for complete search history.

(56) References Cited

U.S. PATENT DOCUMENTS

| | | | |
|---|---|---|---|
| 5,594,921 A | 1/1997 | Pettus | |
| 8,424,055 B2 * | 4/2013 | See | H04L 63/08 |
| | | | 726/21 |
| 10,356,087 B1 | 7/2019 | Vetter | |
| 10,601,800 B2 * | 3/2020 | Kao | H04L 63/102 |
| 10,986,106 B2 * | 4/2021 | Muddu | G06F 40/134 |
| 11,257,393 B2 * | 2/2022 | Atencio | A63F 13/46 |
| 2008/0046349 A1 | 2/2008 | Elberg | |
| 2008/0148344 A1 | 6/2008 | Rubio | |
| 2012/0124664 A1 * | 5/2012 | Stein | G06F 21/552 |
| | | | 726/22 |
| 2015/0264031 A1 | 9/2015 | Liu | |
| 2017/0374014 A1 | 12/2017 | Sastri | |
| 2018/0302300 A1 | 10/2018 | Moeller-Bertram | |
| 2019/0356649 A1 | 11/2019 | Alwen | |
| 2019/0394192 A1 | 12/2019 | Kale | |
| 2020/0065459 A1 | 2/2020 | Himabindu | |
| 2020/0074073 A1 | 3/2020 | Hitaj | |
| 2020/0112568 A1 | 4/2020 | Pereira | |
| 2020/0409690 A1 | 12/2020 | Rouland | |
| 2021/0064860 A1 | 3/2021 | Tuma | |
| 2021/0377260 A1 | 12/2021 | Phillips | |
| 2021/0392133 A1 | 12/2021 | Kim | |
| 2022/0011862 A1 | 1/2022 | Chauhan | |
| 2022/0021711 A1 | 1/2022 | Marsh | |
| 2022/0058039 A1 * | 2/2022 | Soman | H04L 63/02 |

(Continued)

*Primary Examiner* — Maung T Lwin
(74) *Attorney, Agent, or Firm* — Rimon Law, P.C.

(57) ABSTRACT

Systems, methods, and non-transitory computer readable media are configured to perform operations comprising receiving, by a computing system, selected types of identification information from a user; based at least in part on a machine learning model, determining, by the computing system, a risk level for the user; and determining, by the computing system, whether to authenticate the user with an authentication platform based on the risk level.

20 Claims, 22 Drawing Sheets

(56) References Cited

U.S. PATENT DOCUMENTS

| | | |
|---|---|---|
| 2022/0164422 A1 | 5/2022 | Gelardi |
| 2022/0329428 A1 | 10/2022 | Chang |
| 2023/0040678 A1 | 2/2023 | Karlin |
| 2023/0231837 A1* | 7/2023 | Islam ................. H04L 63/1425 726/3 |
| 2023/0252114 A1 | 8/2023 | Cabrera Lozoya |
| 2023/0319028 A1* | 10/2023 | Sardiñas ............... G06F 21/316 726/5 |
| 2024/0037327 A1 | 2/2024 | Kallepalli |
| 2024/0089258 A1 | 3/2024 | Yoon |
| 2024/0311452 A1 | 9/2024 | Buller, Jr. |
| 2025/0021837 A1 | 1/2025 | He |

* cited by examiner

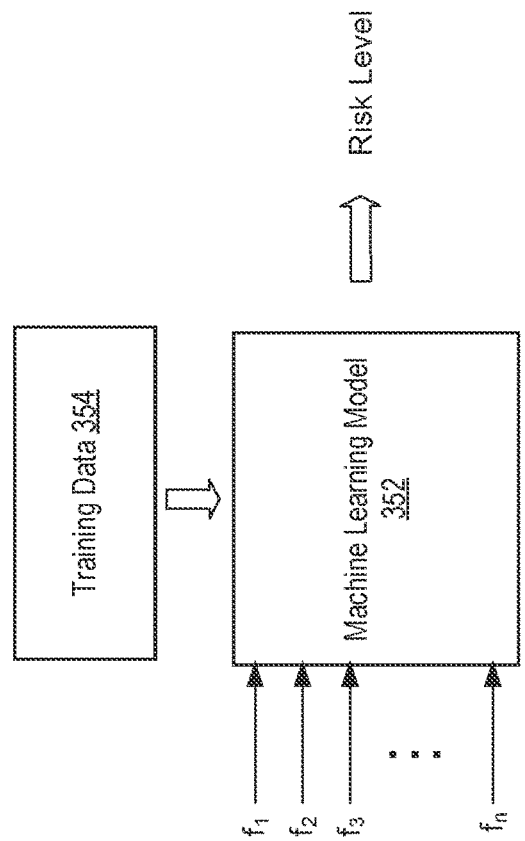

610

Verify your information

Make sure all of the information below is correct.

First name

Milo

Last name

Pinson

Phone Number

+12001001695

Address line 1

6377 Birchwood Hill

City

Littleton

State

CO

Postal code

```
┌─────────────────────────────────────────────────────────────────┐
│ Receive predetermined types of identification information in response to │
│         a prompt presented through an interface to a user       │
│                              702                                │
└─────────────────────────────────────────────────────────────────┘
                                 │
                                 ▼
┌─────────────────────────────────────────────────────────────────┐
│ Based in part on the predetermined types of identification information, │
│     cause authentication of the user for a selection of accounts with a │
│ plurality of institutions maintaining protected data of the user in a plurality │
│                        of secure networks                       │
│                              704                                │
└─────────────────────────────────────────────────────────────────┘
```

Select a machine learning model from a system of machine learning models based on an account with an institution selected by a user
742

Generate authentication information based on the machine learning model
744

Provide the authentication information to the institution to authenticate the user for the account with the institution
746

FIGURE 7C

MACHINE LEARNING BASED AUTHENTICATION PLATFORM

CROSS-REFERENCE TO RELATED APPLICATIONS

This application claims priority to U.S. Provisional Patent Application No. 63/533,468, filed on Aug. 18, 2023 and entitled "Authentication Platform For Secure Access To Disparate Communication Networks", which is incorporated herein by reference in its entirety.

FIELD OF THE INVENTION

The present technology relates to the field of communication networks. More particularly, the present technology relates to a centralized authentication platform to access protected data maintained in a variety of secure networks.

BACKGROUND

In communication networks, authentication is a process that verifies the identity of a user or computer system before providing access to sensitive information. Authentication is often performed or controlled by an institution maintaining the sensitive information that is to be accessed. Proper authentication ensures that only authorized users or computer systems obtain access to protected data.

SUMMARY

Various embodiments of the present technology can include systems, methods, and non-transitory computer readable media configured to perform operations comprising receiving, by a computing system, predetermined types of identification information in response to a prompt presented through an interface to a user; and based in part on the predetermined types of identification information, causing, by the computing system, authentication of the user for a selection of accounts with a plurality of institutions maintaining protected data of the user in a plurality of secure networks.

In some embodiments, the predetermined types of identification information are a name and a mobile phone number of the user entered by the user through the interface.

In some embodiments, identification information other than the name and the mobile phone number of the user is not entered through the interface by the user before the authentication of the user for the accounts with the plurality of institutions.

In some embodiments, the prompt is presented through an embedded component integrated into an application running on a mobile phone of the user, the embedded component controlled by an authentication platform and the application controlled by a service provider that is in communication with the authentication platform through an API.

In some embodiments, the operations further comprise: receiving information from a plurality of resources based on the predetermined types of identification information; based at least in part on the information from the plurality of resources, authenticating the user; and generating through the interface a listing of the accounts with the plurality of institutions and an indication to select at least one account on which to perform a transaction.

In some embodiments, the selection of the accounts with the plurality of institutions is provided by the user through the interface.

In some embodiments, the selection of the accounts with the plurality of institutions are categorized through the interface based on types of the accounts.

In some embodiments, the operations further comprise: generating through the interface an indication that the authentication of the user for the selection of accounts with the plurality of institutions was successful.

In some embodiments, the operations further comprise: generating through the interface information associated with the accounts, the information associated with the accounts comprising a listing of the selection of accounts and real time data associated with the accounts.

In some embodiments, the information associated with the accounts further comprises a prompt for instructions to perform transactions involving the accounts.

Various embodiments of the present technology can include systems, methods, and non-transitory computer readable media configured to perform operations comprising receiving, by a computing system, selected types of identification information from a user; based at least in part on a machine learning model, determining, by the computing system, a risk level for the user; and determining, by the computing system, whether to authenticate the user with an authentication platform based on the risk level.

In some embodiments, the determining a risk level for the user comprises: generating an aggregate risk score based on a risk scoring technique; and determining the risk level based on the aggregate risk score.

In some embodiments, the generating an aggregate risk score based on a risk scoring technique comprises: determining a score for a feature provided by a data source; determining a weight for the feature, the weight generated by at least one of the machine learning model or a deterministic model; combining the score for the feature and the weight for the feature to generate a component score for a term corresponding with the feature; and aggregating component scores of terms corresponding to selected features to generate the aggregate risk score.

In some embodiments, the weight generated by the machine learning model is reconfigured to fall within a predetermined range that constrains the values of the weight.

In some embodiments, the selected features are selected by the authentication platform from information provided by at least one of a mobile network provider, the data source, and an agency that are separate from the authentication platform.

In some embodiments, the determining a risk level for the user comprises: applying features associated with the user to the machine learning model, the machine learning model trained to generate the risk level.

In some embodiments, the features associated with the user are provided by at least one of a mobile network provider, a data source, and an agency that are separate from the authentication platform.

In some embodiments, training data to train the machine learning model comprises features associated with an individual and a label indicating a risk level associated with the individual, the features and the label provided by a data source that is separate from the authentication platform.

In some embodiments, the label is based on at least one of: an appearance of the user in a regulatory sanction list, a mobile phone number of the user being associated with an IP address linked to a country sanctioned by OFAC, and an indication that the user is a PEP.

In some embodiments, after the user is authenticated with the authentication platform, the authentication platform automatically enables authentication of the user for accounts with a plurality of institutions maintaining protected data of the user in a plurality of secure networks.

Various embodiments of the present technology can include systems, methods, and non-transitory computer readable media configured to perform operations comprising selecting, by a computing system, a machine learning model from a system of machine learning models based on an account with an institution selected by a user; generating, by the computing system, authentication information based on the machine learning model; and providing, by the computing system, the authentication information to the institution to authenticate the user for the account with the institution.

In some embodiments, the machine learning models include a general machine learning model at a first level, one or more machine learning models associated with institutions at a second level, and one or more machine learning models associated with types of accounts for the institutions at a third level.

In some embodiments, the selecting a machine learning model comprises: determining whether a machine learning model in the system at the third level is tailored for the type of the account with the institution; and if a machine learning model in the system at the third level is tailored for the type of the account with the institution, utilizing the machine learning model in the system at the third level that is tailored for the type of the account with the institution as the selected machine learning model to generate the authentication information.

In some embodiments, the selecting a machine learning model further comprises: if no machine learning model in the system at the third level is tailored for the type of the account with the institution, determining whether a machine learning model in the system at the second level is tailored for the institution.

In some embodiments, the selecting a machine learning model further comprises: if no machine learning model in the system at the second level is tailored for the institution, selecting the general machine learning model.

In some embodiments, authentication with a selection of accounts with a selection of institutions is selected by the user, and authentication information to authenticate for the selection of accounts with the selection of institutions is based on a plurality of machine learning models in the system.

In some embodiments, the account with the institution is represented in a graph associated with the user, the graph including a first node for the institution, a second node for the account, and authentication information to authenticate the user for the account with the institution.

In some embodiments, the operations further comprise: if authentication for the account with the institution is successful, storing in a database a description of the authentication information that resulted in authentication for the account with the institution.

In some embodiments, the operations further comprise: generating authentication information to authenticate the user or another user for the account with the institution based on the description instead of a machine learning model of the system.

In some embodiments, the machine learning models include at least one of a large language model or a generative pretrained transformer, the machine learning models controlled by an authentication platform and based on a pretrained model controlled by an organization different from the authentication platform.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the present technology.

BRIEF DESCRIPTION OF THE DRAWINGS

FIG. 3B illustrates an example functional block diagram, according to an embodiment of the present technology.

FIGS. 6A-6K illustrate example views of an interface, according to an embodiment of the present technology.

FIGS. 7A-7C illustrate example methods, according to an embodiment of the present technology.

Figure 1:
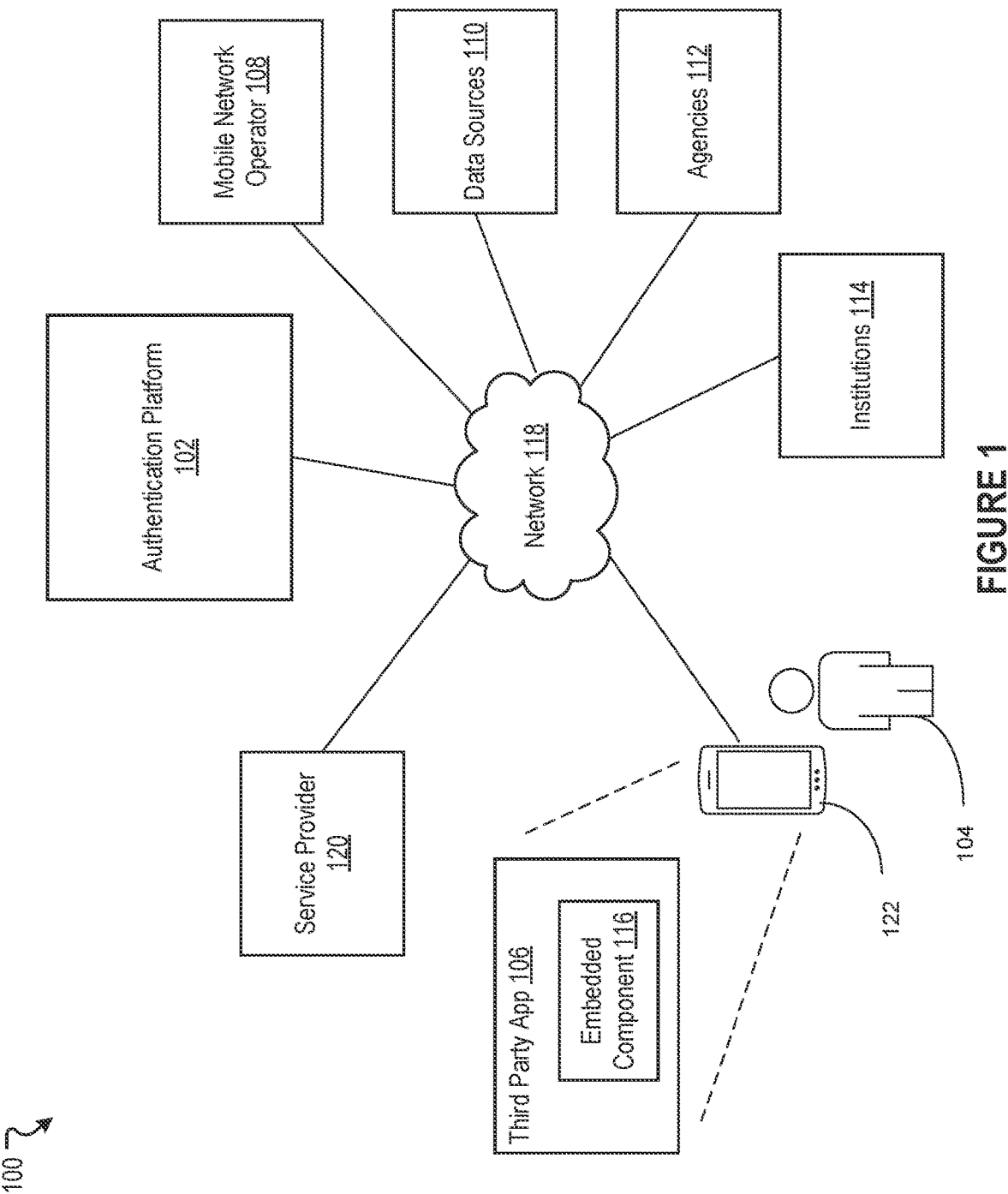
FIG. 1 illustrates an example system including an authentication platform, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the present technology described herein.

DETAILED DESCRIPTION

In communication networks, authentication is a process that verifies the identity of a user or computer system before providing access to sensitive information. Authentication is often performed or controlled by an institution maintaining the sensitive information that is to be accessed. Proper authentication ensures that only authorized users or computer systems obtain access to protected data.

Conventional authentication techniques can involve credentials based authentication and token based authentication. In credentials based authentication, a username and a password are typically required to access sensitive information of a user. Possession of the username and the password of the user results in the ability to have potentially unlimited access to sensitive information maintained in an account of the user. Thus, transmission or other handling of credentials in potentially unsafe network environments poses substantial risk to the security of the sensitive information. As an alternative to credentials based authentication, token based authentication (e.g., the OAuth protocol) involves the use of a token to access sensitive information of a user. Credentials can be exchanged for a token. Submission of the token, not credentials, to a secure network allows the holder of the token to access the sensitive information maintained by the network according to constraints defined by the token. For example, the token may limit access by its holder to a certain timeframe or to certain types of protected data. If the token expires, continued access to protected data requires issuance of additional tokens.

Both credentials based authentication and token based authentication pose significant disadvantages. In credentials based authentication, the need of a user to repeatedly type username and password each time access to protected data in an account is sought can be burdensome for the user. Moreover, when a user requires access to protected data in various accounts maintained by different institutions, entry of multiple sets of credentials is required, further compounding the burden on the user. Token based authentication, which can moderate some disadvantages in credentials based authentication poses its own problems. As one example, token based authentication can be technically challenging to implement for organizations. This problem can be especially acute for smaller sized organizations that lack in house IT expertise in data security and the resources needed to acquire it.

An improved approach rooted in computer technology overcomes the foregoing and other disadvantages associated with conventional approaches specifically arising in the realm of computer technology. The present technology can advantageously allow a user to securely access protected data in multiple accounts maintained by different institutions across different protected networks—and securely share access to the protected data—without the need for credentials based authentication or token based authentication. The user can be prompted by an authentication platform to provide a predetermined, limited amount and type of identification information. In some instances, the user can be prompted through a component controlled by the authentication platform that is embedded in an application controlled by a service provider separate from the authentication platform. For example, the authentication platform may prompt the user to provide only the name of the user and the mobile phone number of the user as the identification information.

Based on receipt of the identification information from the user, the authentication platform can acquire additional information about the user from various resources, such as mobile network operators, data sources, and agencies. The additional information can be supportive of a determination regarding whether the user can be authenticated with the authentication platform. In this regard, the authentication platform can obtain information from a mobile network operator providing mobile services to the mobile phone of the user. In addition, the authentication platform can obtain reports from various data sources that perform identity verification services. Further, the authentication platform can obtain reports about the user from various agencies. Based on the acquired information, the authentication platform can generate a risk level for the user. In some instances, the risk level can be based on an aggregate risk score determined from a risk scoring technique. In some instances, the risk level is determined based on a machine learning model that is trained based on training data that includes information acquired by the authentication platform from the various resources. Based on the determined risk level, the authentication platform can determine whether the user can be authenticated or not with the authentication platform.

The authentication module can generate and update a graph associated with the user. The graph can reflect information acquired by the authentication platform about the user. The graph can include nodes representing, for example, the user, various types of information identifying the user (e.g., personally identifiable information), different institutions to which the user has entrusted protected data, and different accounts controlled by the different institutions with which the protected data is associated. The graph can be updated to reflect changes in relationships between the user and different accounts with various institutions.

Based on the graph associated with the user, the authentication platform can present for the user a listing of accounts of the user. The user can be prompted to select from the listing certain accounts on which the user may wish to perform a transaction, such as a transaction additionally supported by the service provider. The authentication platform can utilize a system of machine learning models to determine how to authenticate the user for the accounts selected by the user. The system of machine learning models can include large language models reflecting a hierarchy of focus on different institutions and different types of accounts. For example, the machine learning models can be adapted for their respective focus based on prompt engineering or fine tuning. Each machine learning model can generate specific information, or authentication information, to authenticate the user for a particular type of account with an institution. The authentication platform can attempt authentication based on the authentication information. If the user can be successfully authenticated, the authentication information can be stored by the authentication platform for future attempts to authenticate for that particular type of account with the institution. Further, if the user can be successfully authenticated, the authentication information, or specific types of information required for authentication, that resulted in successful authentication can be reflected in the graph associated with the user.

Once authenticated for accounts selected by the user, the authentication platform can display real time protected data associated with the accounts for the user. The user can be prompted for instructions in relation to possible transactions on the accounts. Upon receipt of the instructions, transactions desired by the user on the accounts can be initiated and performed according to the instructions. Accordingly, based on provision by the user of a limited set of identification information, the authentication platform in real time (or near real time) can provide to the user access to protected data of various accounts with different institutions, as well as the capability to share such access with service providers to perform transactions relating to the accounts. More details relating to the present technology are provided herein.

FIG. 1 illustrates an example system 100 including an authentication platform 102, according to an embodiment of the present technology. The authentication platform 102 can support multiple authentications to access protected data of a user 104. The authentications can be performed with secure networks in which accounts with various institutions 114 are maintained. As an example, one type of protected data accessible through the authentication platform 102 can include financial information of the user 104. For instance, the financial information can relate to accounts associated with financial liabilities assumed by the user 104. For example, the institutions 114 can include financial institutions such as banks, credit unions, insurance companies, brokerage firms, and investment dealers. A mobile phone (or other mobile computing device) 122, such as a mobile phone, associated with the user 104 can allow the user to communicate with the authentication platform 102. A third party application 106 controlled by a service provider 120 can run on the mobile phone 122. For example, the service provider 120 can perform services on behalf of the user 104 in relation to the accounts of the user 104. The third party application 106 can include an embedded component (or utility) 116 supported and controlled by the authentication platform 102. The embedded component 116 can prompt the user 104 to provide identification information. For example, the identification information can include selected types of personally identifiable information (PII).

Based on receipt of the identification information, the authentication platform 102 can communicate with a mobile network operator 108 providing mobile services for the mobile phone 122 of the user 104. The authentication platform 102 can acquire information from the mobile network operator 108 to facilitate authentication of the user 104 with the authentication platform 102. In addition, based on the identification information provided by the user and information acquired from the mobile network operator 108, the authentication platform 102 can acquire additional information from data sources 110 and agencies 112 to facilitate authentication of the user 104 with the authentication platform 102. For example, the data sources 110 can provide identity verification services (e.g., KYC related services). For example, the agencies 112 can include credit reporting bureaus. The identification information provided by the user and the information acquired from the mobile network operator 108, the data sources 110, and the agencies 112 can be utilized to determine a risk level for the user 104. The risk level can be determined, for example, by a risk scoring technique that utilizes a machine learning model to determine certain parameters for the risk scoring technique or by a machine learning model trained to predict risk levels. The risk level for the user 104 can indicate a probability that the user can be authenticated—i.e., a probability that the user is whom the user claims to be. Based on the risk level, the user 104 can be authenticated, or not authenticated, with the authentication platform 102.

The authentication platform 102 can utilize the information obtained from the resources, as reflected in a graph associated with the user 104, to determine a listing of accounts with institutions 114 that maintain protected data of the user 104. For example, one type of account can be a liability account. The listing of accounts can be displayed to the user 104. The authentication platform 102 can prompt the user 104 to select certain accounts from the listing on which the user 104 may wish to perform transactions through the authentication platform 102 and the service provider 120. Based on a system of machine learning models, the authentication platform 102 can determine the specific information required by a particular institution to authenticate for an account with the institution selected by the user. For each selected account with an institution, the authentication platform 102 can provide the institution the specific information that is required to authenticate with the account. The authentication platform 102 can provide a listing of accounts for which the user 104 has been successfully authenticated. The listing of accounts can include various types of real time data associated with the account. The user 104 can be prompted to enter instructions including parameters or preferences for any desired transaction to be performed on each account. The authentication platform 102 can share the instructions with the service provider 120 to initiate and facilitate performance of the transaction according to the instructions. The authentication platform 102 can implement various protections to safeguard data that is received or maintained, such as SOC (Service Organization Control) compliance and PCI (Payment Card Industry) compliance.

Communications among the authentication platform 102 and the third party application, 106, the embedded component 116, the mobile phone 122 of the user 104, the mobile network operator 108, the data sources 110, the agencies 112, the institutions 114, and other organizations can occur over a communication network 118. The communication network 118 can include any suitable communication medium or protocol supporting remote communication with the authentication platform 102. Application programming interfaces (APIs) supported by servers or backend systems of the authentication platform 102, the service provider 120, the mobile network operator 108, the data sources 110, the agencies 112, and the institutions 114 can support exchange of information, as described herein. More details regarding the design and operation of the authentication platform 102 in the system 100 are provided herein.

In some embodiments, the authentication platform 102 can be implemented by a server system. In some embodiments, some of the functionality of the authentication platform 102 can be performed by an application designed by the authentication platform 102 and running on a client computing device of a user. In some instances, the application can be or include a component or utility embedded in a different application controlled by a service provider in communication, collaboration, or partnership with the authentication platform 102. In some embodiments, the functionality of the authentication platform 102 can be distributed between a server and an application running on a client computing device. Although the present technology is sometimes herein described in relation to a platform for authentication to access financial accounts for purposes of illustration, the present technology can apply to an authentication platform to access any type of protected data and any type of account with any type of institution that is distributed over one or more secure networks controlled by various institutions. In some instances, the system 100 can include at least one data store (not shown) in communication with or integrated into the authentication platform 102. The data store can maintain information required to support operation of the authentication platform 102. For example, the data store can maintain information about users and their accounts with different institutions. The maintained information can include, for example, identification information associated with users, institutions with which users may have accounts, account information, graphs associated with users, reports and information provided by various resources, a risk scoring algorithm to facilitate authentication of users with the authentication platform 102, cutoff values defining risk levels, machine learning models to facilitate authentication of users with various institutions, authentication information that has resulted in successful authentication with institutions, and other information discussed herein that support operation of the authentication platform 102.

Figure 2:
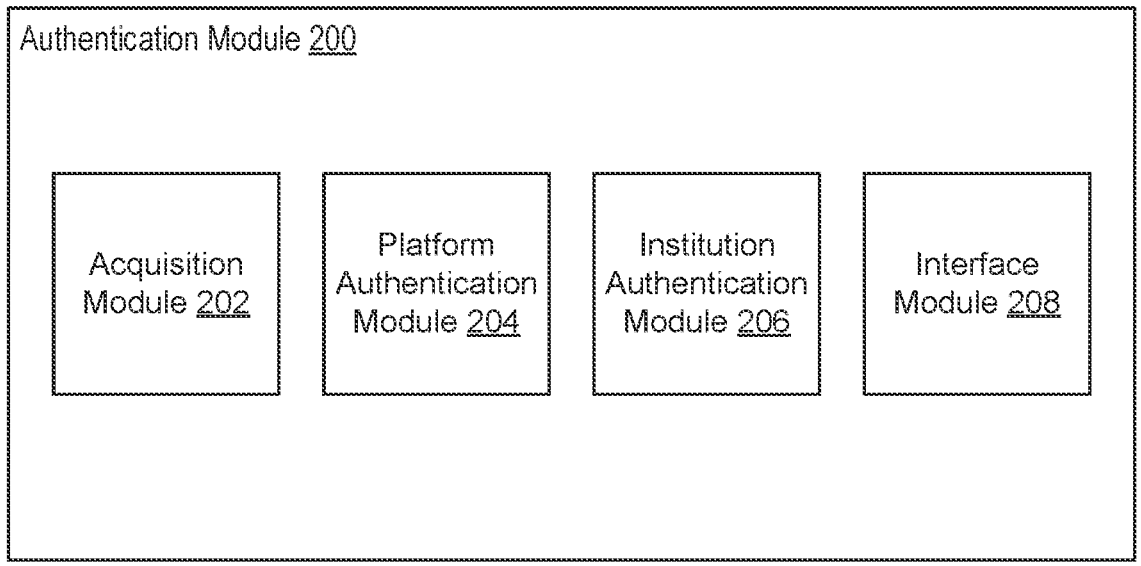
FIG. 2 illustrates an example authentication module, according to an embodiment of the present technology.

FIG. 2 illustrates an example authentication module 200, according to an embodiment of the present technology. In some embodiments, the authentication platform 102 can implement the authentication module 200. The authentication module 200 can receive identification information provided by a user, such as the user 104. Based on the identification information, the authentication module 200 can automatically perform authentication with the authentication platform 102 as well as authentication with various institutions, such as the institutions 114, that securely maintain protected data of the user in various accounts. The authentication module 200 can access the protected data of the user as maintained by the various institutions and share access to the protected data as desired by the user. The authentication module 200 can include an acquisition module 202, platform authentication module 204, an institution authentication module 206, and an interface module 208. The components (e.g., modules, elements, features, functionality, operations, etc.) shown in this figure and all figures herein are exemplary only, and other implementations may include additional, fewer, integrated, or different components. Some components may not be shown so as not to obscure relevant details. In various embodiments, one or more of the functionalities described in connection with the acquisition module 202, the platform authentication module 204, the institution authentication module 206, and the interface module 208 can be implemented in any suitable combinations.

The acquisition module 202 can obtain information from various resources (e.g., mobile network operators, data sources, agencies, etc.) that can be utilized to authenticate the user with the authentication platform 102 and with various institutions maintaining protected data of the user. The acquisition module 202 can obtain identification information provided or entered by a user and authenticate the user with the authentication platform 102 and with various institutions without provision or entry by the user of any additional identification information (e.g., PII). For example, the identification information can include certain types of identification information, such as certain types of PII, of the user that are provided by the user. For instance, the certain types of identification information provided by the user can include the name of the user and the mobile phone number of the user. In some embodiments, the certain types of identification information provided by the user are limited to only the name of the user and the mobile phone number of the user. In some embodiments, the identification information provided by the user is limited to and does not exceed a predetermined number of types of identification information. For example, the identification information provided by the user can be limited to two types of PII (e.g., name and mobile phone number), or three types of PII (e.g., name, mobile phone number, and SSN), or some other selected number of types of PII. In some embodiments, after provision or entry by the user of the selected number of types of identification information, no other identification information or other type of identification information is requested or required from the user, or provided or entered by the user, to authenticate the user for the authentication platform 102 and for accounts with various institutions maintaining protected data of the user within their respective secure networks. In some embodiments, after provision by the user of the selected number of types of identification information, and without provision by the user of additional types of identification information, the authentication platform 102 may present to the user identification information associated with the user merely to request confirmation by the user of the correctness of the identification information.

The identification information provided by the user can be acquired through an embedded component, such as the embedded component 116, associated with the authentication platform 102. The embedded component can be integrated in or part of a separate application, such as the third party application 106, provided by a service provider, such as the service provider 120. For example, the separate application can be running on a mobile computing device, such as the mobile phone 122, of the user. Based on the embedded component, the mobile phone can access a server system associated with the authentication platform 102 through internet access provided to the mobile phone by a mobile network operator, such as the mobile network operator 108. In some embodiments, other types of information can be obtained from the user.

The acquisition module 202 can prompt the mobile network operator based on the identification information provided by the user to perform a verification and a silent network authentication (SNA). For example, in response to receipt of the name and the mobile phone number provided by the user, and with the consent of the user, the acquisition module 202 in real time can request the mobile network operator to verify that the mobile phone number is correctly associated with (or belongs to) the name. Further, the acquisition module 202 can request the mobile network operator to verify that the mobile phone number provided by the user is the same mobile phone number that accessed or communicated with the backend or server system (e.g., web server) of the authentication platform 102. Such verifications can be utilized in authentication of the user, as discussed in more detail herein. In addition, with consent provided by the user, the acquisition module 202 can obtain from the mobile network operator additional PII associated with the user, such as date of birth, address, or the like. For example, consent of the user can be provided through the embedded component.

The acquisition module 202 can obtain information from various data sources, such as the data sources 110. The identification information associated with the user, including the identification information provided by the user and the identification information obtained from the mobile network operator, can be provided by the acquisition module 202 to the data sources. For example, a data source can include, for example, an identity verification provider. Based on the identification information associated with the user, the data source can perform, for example, various searches and checks on the user, such as KYC (Know Your Customer) or AML (Anti-Money Laundering) related diligence. Information relating to the results of such searches and checks in relation to the user can be included in a report that is provided from the data source to the acquisition module 202. A report from a data source can contain different types of information, or features, regarding a user that can inform a decision regarding whether to authenticate the user. Different data sources can provide different types of information about the user to the acquisition module 202.

The types of information provided by the data sources can include, for example, features relating to various types of identification information (e.g., PII) associated with the user. The types of information provided by the data sources can include PII of the user including, for example, an address of the user, a date of birth of the user, a social security number of the user, and the like. In addition, the types of information provided by the data sources can include, for example, features relating to mobile phone statuses associated with the user. For example, the types of information can indicate that the user acquired a new SIM or new mobile phone and the date of the acquisition, that the mobile phone has been stolen, that the mobile phone has been disabled or enabled, and the like. Further, the types of information provided by the data source can include, for example, features relating to matching and mismatching between the identification information provided by the user and corresponding information maintained or discovered by the data source. For example, as discussed, the identification information provided by the user can include the name and the mobile phone number of the user. In this example, the types of information provided by the data source can include an indication that the mobile phone number provided by the user is different from a mobile phone number for the user as independently determined by the data source. As another example, the types of information provided by the data source can include an indication that an SSN provided by the user is the same as an SSN for the user as independently determined by the data source. As yet another example, the types of information provided by the data source can include an indication that an address provided by the user is different from an address for the user as independently determined by the data source. The types of information provided by the data source also can include, for example, an indication of an absence of records or data accessible by the data source that correspond to identification information provided by the user and a related indication that the accuracy of the identification information provided by the user was not able to be verified by the data source.

Further, the types of information provided by the data source can include, for example, scores. A score can be associated with each feature (or characteristic) provided in a report by the data source. In some instances, a score associated with a particular feature can indicate an estimate regarding the probability of the feature. For example, the score can be a first value (e.g., value of 0) indicating low probability or a second value (e.g., value of 1) indicating high probability. As just one example, the data source can provide to the acquisition module 202 a score for a feature corresponding to a mismatched address of the user. In this example, the score for the feature is an indication by the data source of a probability that the address of the user is mismatched.

In addition, the types of information provided by the data source can include, for example, a risk code (or risk tag). The data source can provide to the acquisition module 202 a variety of risk codes that describe or indicate discovered statuses, conditions, or activities associated with the user. In some instances, the risk codes can describe legality, propriety, or risk in a potential relationship or interactions with the user. For example, a risk code can indicate that the user appears in an OFAC (Office of Foreign Asset Control) list (e.g., SDN List (List of Specially Designated Nationals and Blocked Persons), NS-MBS List (Non-SDN Menu-Based Sanctions List), etc.). As another example, a risk code can indicate that the mobile phone number of the user is associated with an IP address linked to a country sanctioned by OFAC. As yet another example, risk codes can indicate that identification information provided by the user and corresponding information accessible by the data source do not match (e.g., phone numbers are mismatched, last names are mismatched, etc.).

The acquisition module 202 can obtain information from various agencies, such as the agencies 112. The identification information provided by the user as well as the other identification information obtained by the acquisition module 202 can be provided by the acquisition module 202 to an agency. For example, an agency can include a credit reporting bureau. The agency can return a credit report for the user. The credit report can include various types of information, such as details about tradelines and liability accounts of the user, financial institutions associated with the liability accounts, public records such as bankruptcies involving the user, and a list of institutions that have asked to see the credit report of the user. In addition, the credit report can contain various fraud alerts and other flags concerning the user, such as an indication that the identity of the user has been reported as threatened or stolen.

The platform authentication module 204 can determine a risk level associated with the user to inform whether the user can be (or should be) authenticated with the authentication platform 102. The platform authentication module 204 can implement a risk scoring technique to generate an aggregate risk score associated with the user. The aggregate risk score can indicate a risk level associated with the user that informs whether the user can be authenticated with the authentication platform 102. The risk scoring technique can include an aggregation of various terms associated with certain types of information obtained by the acquisition module 202. The terms aggregated in the risk scoring algorithm can correspond to selected information provided by a mobile network operator and selected information from the reports provided by the data sources and agencies. The selected information provided by a mobile network operator and the selected information from the reports provided by the data sources and agencies constitute features corresponding to the terms on which the risk scoring technique is based. The aggregation can be, for example, an average, sum, or other combination or calculation involving component scores that correspond to the individual terms.

Each term can correspond to a feature associated with the user, as described herein. For example, the risk scoring technique can include terms corresponding to features relating to whether the mobile network operator has verified the association between the mobile phone number and the name provided by the user and whether the mobile network operator has verified possession of the mobile phone through SNA, as discussed herein. As another example, the risk scoring technique can include terms corresponding to features relating to mismatches (or matches) in the PII of the user, such as a mismatched name of the user, a mismatched address of the user, etc. In some instances, mismatched identification information can be determined by a data source alone. In some instances, mismatched identification information can be determined by the acquisition module 202. For instance, the acquisition module 202 may receive inconsistent indications or values for a particular type of identification information (e.g., SSN, address, etc.) from a data source versus from an agency. As another example, the risk scoring technique can include terms corresponding to features relating to the status of the mobile phone of the user, such as whether the mobile phone was recently stolen, whether the mobile phone is disabled, etc. As indicated, the features used in the risk scoring technique can be a selection, or portion, of all features (or characteristics) set forth in the information provided by the resources. The features can be selected by the authentication platform 102 based on their importance in contributing to an accurate determination of a risk level that informs whether to authenticate the user. For example, the selected features can be those features that have a potential impact on the financial health or status of an individual or implicate a risk associated with OFAC related considerations.

A term can reflect the combination of a score for a feature as provided by the data sources or the authentication platform 102 as well as a weight that represents the importance of the feature in determination of an accurate aggregate risk score for the user. For example, the combination of the score for the feature and the weight can be a multiplication of the score for the feature and the weight to generate a component score for the corresponding term. The risk scoring technique can include a selected combination of terms corresponding to a selected combination of features known by the acquisition module 202. The selected combination of terms corresponding to the selected combination of features is configurable and can vary depending on the implementation. For example, in some instances, the risk scoring technique can include a first set of terms corresponding to a first set of features. In other instances, the risk scoring technique can include a second set of terms corresponding to a second set of features, where the second set of terms corresponding to the second set of features is different from the first set of terms corresponding to the first set of features.

In some embodiments, the platform authentication module 204 can cause a machine learning model (e.g., neural network) to generate the weights to be applied to features to determine component scores for corresponding terms in the risk scoring technique. Based on training data, the machine learning model can be trained to generate the weight for each feature selected for inclusion in the risk scoring technique. The training data can be generated based on a variety of techniques. For example, training data can be generated from manual determinations of weights for features. The manual determination of weights for features in accordance with a deterministic model, as described in more detail below, can be accumulated and used as training data to train the machine learning model. During a training phase, a particular weight value can be assigned to a particular feature based on the relative importance of the feature in generating an accurate aggregate risk score. In some instances, during the training phase, a weight value associated with a feature can change as the importance of the feature changes. Accordingly, the weight for a feature can change during an evaluation phase based on the machine learning model. For example, assume that a feature relates to an address mismatch. In one instance, the address mismatch can have a first weight value. In another instance, information provided by a data source can indicate that the user recently moved residences. As a result, in this instance, the address mismatch can have a second weight value (e.g., a value of 0) that is less than the first weight value. In some embodiments, the weights generated by the machine learning model can be subject to an independent analytical check. For example, the platform authentication module 204 can determine whether the weights are within predetermined ranges that constrain the values of weights. If a generated weight falls outside a predetermined range associated with the weight, the weight can be reconfigured to have a value that falls inside the predetermined range. Further, the machine learning model can be retrained based on the reconfigured weight. As another example, the machine learning model can determine a weight for a particular feature (or features) that otherwise would result in (or would not preclude) authentication of the user. However, if the presence of the particular feature is deemed by the authentication platform 102 to be determinative of a decision not to authenticate the user with the authentication platform 102, then the weight for the feature as determined by the machine learning model can be discarded or demoted in importance.

In some embodiments, the weights to be applied to features to determine component scores for corresponding terms in the risk scoring technique can be generated by a deterministic model. For example, manual prioritization of each feature in relation to its importance in the generation of an accurate aggregate risk score can inform the appropriate value of a weight for the feature. For example, it may be determined that a first feature (e.g., mismatched SSNs) is more important than a second feature (e.g., mismatched addresses) in the determination of an accurate aggregate risk score for the user. In this example, the platform authentication module 204 can assign a weight for the first feature that is relatively larger than a weight assigned for the second feature. As another example, it may be determined that a third feature (e.g., recently stolen mobile phone) is more important than a fourth feature (e.g., matching dates of birth) in the determination of an accurate aggregate risk score for the user. In this example, the platform authentication module 204 can assign a weight for the third feature that is relatively larger than a weight assigned for the fourth feature. In some instances, the sole presence of a feature or set of features may be determined to be dispositive or determinative of a certain value (or range of values) for an aggregate risk score or for a particular risk level. For instance, a first feature (e.g., unmatched name), a second feature (e.g., unmatched mobile phone number), or a third feature (e.g., failed verification through SNA), or any combination of these or other features can be assigned relatively large weights so that, when a selected feature or combination of features is deemed to be present, the component scores of their corresponding terms will contribute to the determination of a desired value for an aggregate risk score (e.g., an aggregate risk score corresponding to high risk) or a desired risk level (e.g., high risk). For example, a relatively large weight can be assigned to a feature relating to a mobile phone number that does not match a name and a relatively large weight can be assigned to a feature relating to a failed verification through SNA. In this example, the presence (or high probability) of the features can result in components scores for terms corresponding to these features that most influence or dictate the value of the aggregate risk score or cause the aggregate risk score to be associated with a certain risk level (e.g., high risk). Many variations are possible. In some embodiments, the weights determined through the deterministic model can be used to train the machine learning model that generates the weights to be applied to features in the risk scoring technique discussed herein.

Based on the aggregate risk score, the platform authentication module 204 can determine a risk level for the user. In some embodiments, the risk level can be a binary designation, such as a first designation of risk (e.g., high risk level) or a second designation of risk (e.g., low risk level). In the example of a binary designation, the platform authentication module 204 can specify a cutoff value that separates a first portion of a range of possible risk values from a second portion of the range of possible risk values. In some embodiments, the cutoff value is selected as the value at the midpoint in the range of possible risk values. If the aggregate risk score generated by the platform authentication module 204 falls into the first portion of the range of possible risk values, the user can be associated with a first designation of risk corresponding to the first portion, such as "high risk". If the aggregate risk score generated by the platform authentication module 204 falls into the second portion of the range of possible risk values, the user can be associated with a second designation of risk corresponding to the second portion, such as "low risk". A designation of high risk can be associated with a determination by the platform authentication module 204 that the user cannot (or should not) be authenticated and a designation of low risk can be associated with a determination by the platform authentication module 204 that the user can (or should) be authenticated. In some embodiments, the risk level can be a nonbinary designation, such as a first risk level, a second risk level, and a third risk level that are defined in relation to a range of possible risk values. For example, a first portion of the range of possible risk values can correspond to the first risk level, a second portion of the range of possible risk values can correspond to the second risk level, a third portion of the range of possible risk values can correspond to the third risk level. In this example, the platform authentication module 204 can specify a first cutoff value separating the first risk level and the second risk level and a second cutoff value separating the second risk level and the third risk level. Further, in this example, an aggregate risk score generated by the platform authentication module 204 that falls into the first portion of the range of possible risk values can be associated with the first risk level, such as "high risk"; an aggregate risk score generated by the platform authentication module 204 that falls into the third portion of the range of possible risk values can be associated with a third risk level, such as "low risk"; and, an aggregate risk score generated by the platform authentication module 204 that falls into the second portion of the range of possible risk values can be associated with a second risk level, such as "medium risk". In the event of the aggregate risk score resulting in a designation of medium risk, the platform authentication module 204 can take further action to determine the identify the user. For example, the platform authentication module 204 can repeatedly prompt the user to provide additional identification information (e.g., such as PII) and, based on the additional identification information, determine additional aggregate risk scores, or update the aggregate risk score, until an aggregate risk score results in "high risk" or "low risk". Many variations are possible.

In some embodiments, the platform authentication module 204 can select a cutoff value that is not the value at the midpoint in the range of risk values. For example, the cutoff value in a range of risk values can be configurable based on various considerations, such as the types or amount of identification information provided by the user to the authentication platform 102, the data sources that are utilized by the authentication platform 102, and the number of matches and mismatches that were identified by the data sources. For example, assume that a first user provides two types of PII to the authentication platform 102 in a first instance and that a second user provides five types of PII to the authentication platform 102 in a second instance. In these instances, different levels of matching are expected in view of the different amounts of PII provided. Accordingly, in this example, the platform authentication module 204 can select a cutoff value in the range of risk values in the first instance that is different from the cutoff value in the range of risk values in the second instance. For instance, the portion of the range of risk values associated with authentication in the first instance can be larger than the portion of the range of risk values associated with authentication in the second instance. As another example, the cutoff value can be a first cutoff value for a first data source and a second cutoff value for a second data source. Many variations are possible.

Figure 3A:
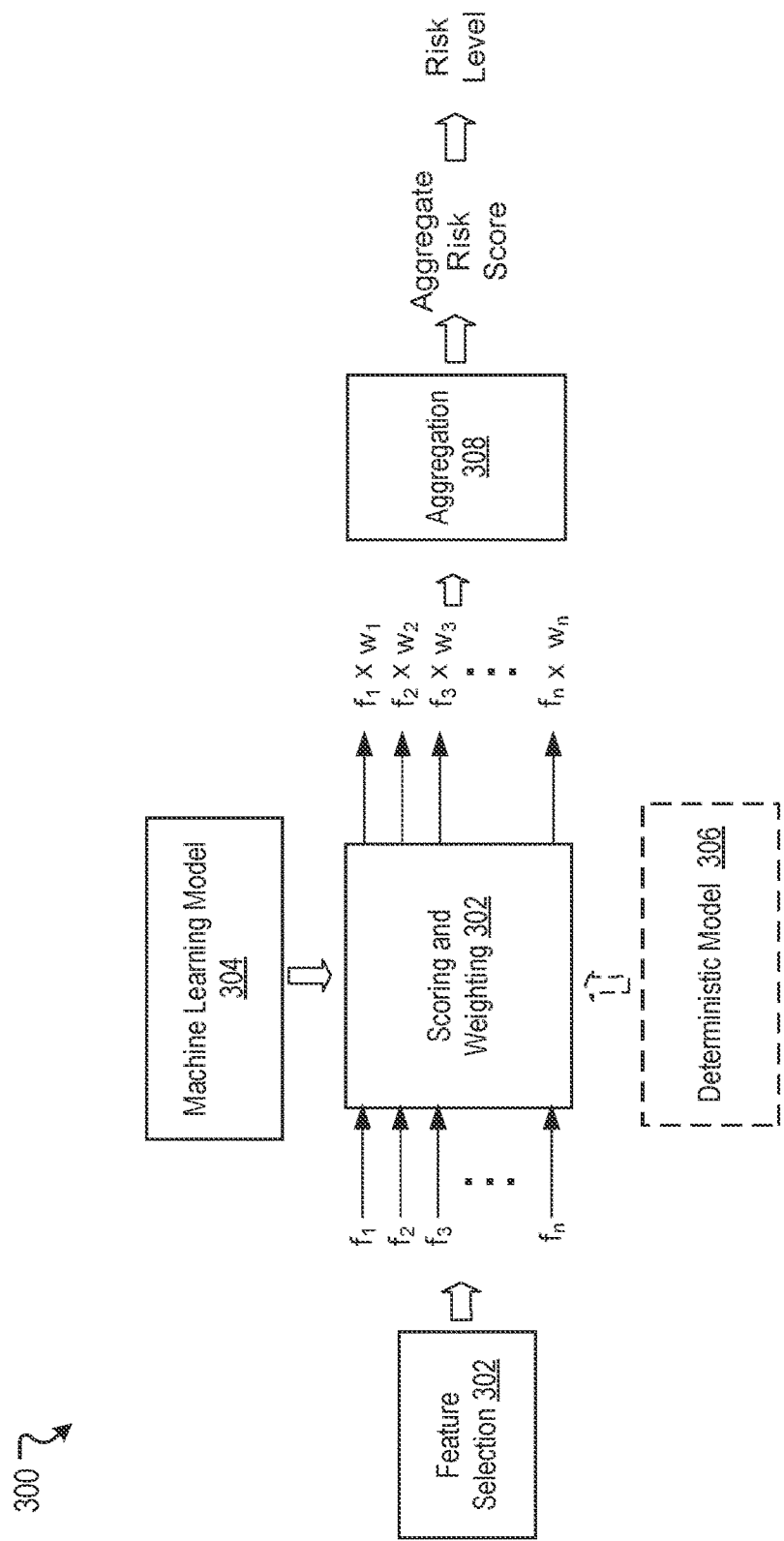
FIG. 3A illustrates an example functional block diagram, according to an embodiment of the present technology.

FIG. 3A illustrates an example functional block diagram 300 relating to the risk scoring technique, according to an embodiment of the present technology. In some embodiments, the functional block diagram 300 can be implemented by the platform authentication module 204. At 302, certain features from information obtained by the acquisition module 202 from the resources can be selected for the risk scoring technique. Each selected feature can be associated with a term. A term corresponding to a feature can include a score relating to the feature and a weight for the feature. In some embodiments, a machine learning model 304 can determine weights for the features. In some embodiments, a deterministic model 306 can determine weights for the features. For each term, a combination (e.g., multiplication) of the score for a feature and the weight for the feature can result in a component score associated with the term. At 308, the component scores associated with the terms corresponding to the selected features can be aggregated (i.e., summed). Aggregation of the terms can generate an aggregate risk score. Based on the aggregate risk score, a risk level for the user can be determined. The risk level can indicate whether the user can be authenticated with the authentication platform 102.

In some embodiments, the platform authentication module 204 can generate a risk level for the user based on a machine learning model. The machine learning model can be configured to generate the risk level based on training data. In some embodiments, the training data can include examples associated with information provided by the data sources. In some embodiments, the training data examples can include all features in reports provided by the data sources. In addition, the training data can include labels based on selected risk tags provided by the data sources. As discussed, risk tags and their associated levels of risk can be provided by the data sources. The levels of risk (e.g., high risk level, low risk level) associated with a selection of the risk tags provided by the data sources can be utilized as labels in the training data. For example, the selection of risk tags associated with levels of risk that are utilized as labels can include risk tags indicating that the user appears in an OFAC SDN List or Non-SDN MBS List or that the mobile phone number of the user is associated with an IP address linked to a country sanctioned by OFAC. As another example, the selection of risk tags associated with levels of risk that are utilized as labels can include risk tags indicating that the user is a politically exposed person (PEP). In some instances, some of the risk tags (e.g., mismatching last name) and their associated levels of risk provided by the data sources are not utilized as labels for the training data. In addition, the training data can include sets of features associated with users and corresponding labels based on determinations made by the authentication module 200. For example, the authentication module 200 may conclude that the presence (or absence) of certain features in a set of features for a user indicates that the user can not be authenticated. In this example, the training data can include a label, which is generated by the authentication module 200 for the set of features associated with the user, that indicates high risk. For instance, when a set of features for a user includes a feature relating to a discrepancy in the SSN of the user, the authentication module 200 can generate a label associated with high risk for the associated training data example. Many variations are possible.

FIG. 3B illustrates an example functional block diagram 350 relating to determination of a risk level based on a machine learning model, according to an embodiment of the present technology. In some embodiments, the functional block diagram 350 can be implemented by the platform authentication module 204. A machine learning model 352 (e.g., neural network) is configured to generate a risk level for a user. In contrast to the risk scoring technique, the risk level generated by the machine learning model 352 can be based on all (or some) known features of the user as provided by the resources. The machine learning model 352 can be trained based on training data that includes all, or a subset of, information provided by the mobile network operator and information (e.g., features and associated scores) provided by the data sources and agencies. As discussed, the training data can include labels corresponding to certain risk codes provided by the data sources. In some embodiments, the training data can include labels that are generated by the authentication module 200. The authentication module 200 can further customize the machine learning model 352 by providing desired labels for the presence of certain features. For example, the authentication module 200 can specify a label of "high risk" when the mobile phone number provided by the user does not match the name provided by the user, no matter the presence (or absence) of other features associated with the user.

Based on information obtained by the acquisition module 202, the institution authentication module 206 can generate a graph associated with the user to support authentication with an institution. The institution authentication module 206 can generate a separate graph for each user authenticated (or to be authenticated) by the authentication platform 102. The graph can contain pertinent information about the user and accounts of the user to support authentication of the user with an institution. The graph can include a node representing the user. The node representing the user can be connected to nodes representing different types of data that can be used to authenticate the user. For example, the data used to authenticate the user can include various types of PII, such as name, mobile phone number, SSN, date of birth, address, and the like. Each item of PII can be represented by a separate node. The node representing the user also can be connected to one or more nodes representing one or more credit reports issued by various credit reporting agencies. In addition, the node representing the user can be connected to one or more nodes representing accounts of the user. Each node representing an account can contain information about the liability account, such as an account number, the type of account, an interest rate for account, and the like. The type of account can be, for example, credit card, student loan, mortgage, etc. The node representing an account can be connected to a node representing an institution, such as a financial institution, associated with the liability account. For example, the institution can be a bank, credit union, mortgage servicer, etc.

The graph can be dynamically configured so that, as new information about the user and accounts of the user are obtained by the authentication module 200, the graph is automatically updated. The graph can be automatically updated based on new information received from any resource, such as a mobile network operator, a data source, or an agency. For example, if the acquisition module 202 receives new PII associated with the user (e.g., date of birth), a node in the graph associated with the user can be created to represent the new type of PII. As another example, if the acquisition module 202 receives an update to PII associated with the user (e.g., address), the node representing the PII can be revised to reflect the updated PII. In this example, the PII that was updated can be retained as historical information and used to evaluate mismatched features. As yet another example, if the acquisition module 202 obtains information reflecting a new account assumed by the user (e.g., credit card account), a node in the graph associated with the user can be generated to represent the new liability account. As yet still another example, if the acquisition module 202 obtains information that the financial institution to which an account is associated has changed (e.g., sale of mortgage), the node representing the financial institution can be updated to reflect the new financial institution. Any changes relating to the user and the accounts of the user can be reflected in the graph. In some embodiments, graphs associated with different users can overlap when, for example, the users are both associated with a particular account. For example, when users are joint account holders of an account, the graphs of the users may show nodes representing each user that are connected to a common node representing the account.

Figure 4A:
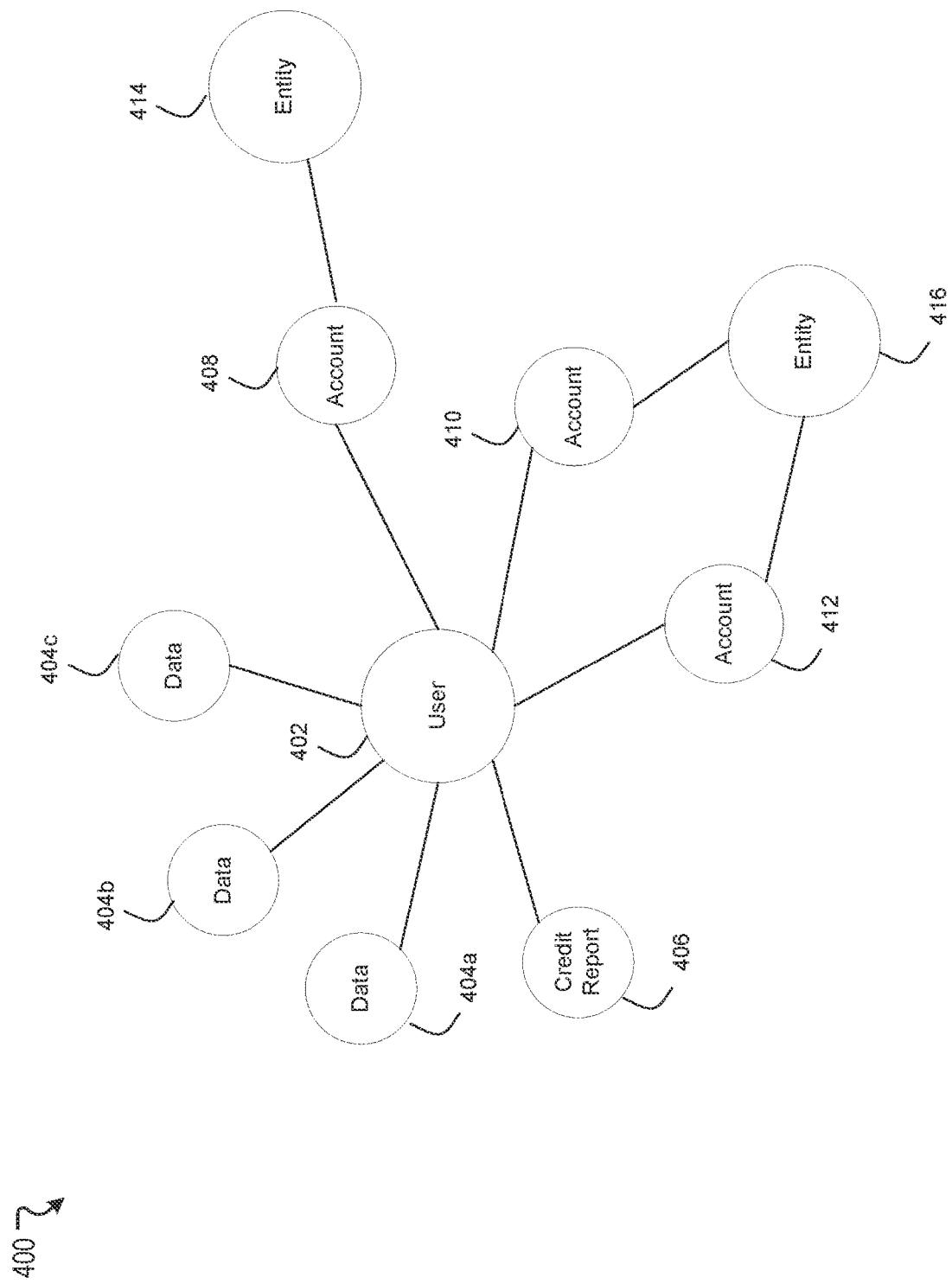
FIG. 4A illustrates an example graph, according to an embodiment of the present technology.
Figure 4B:
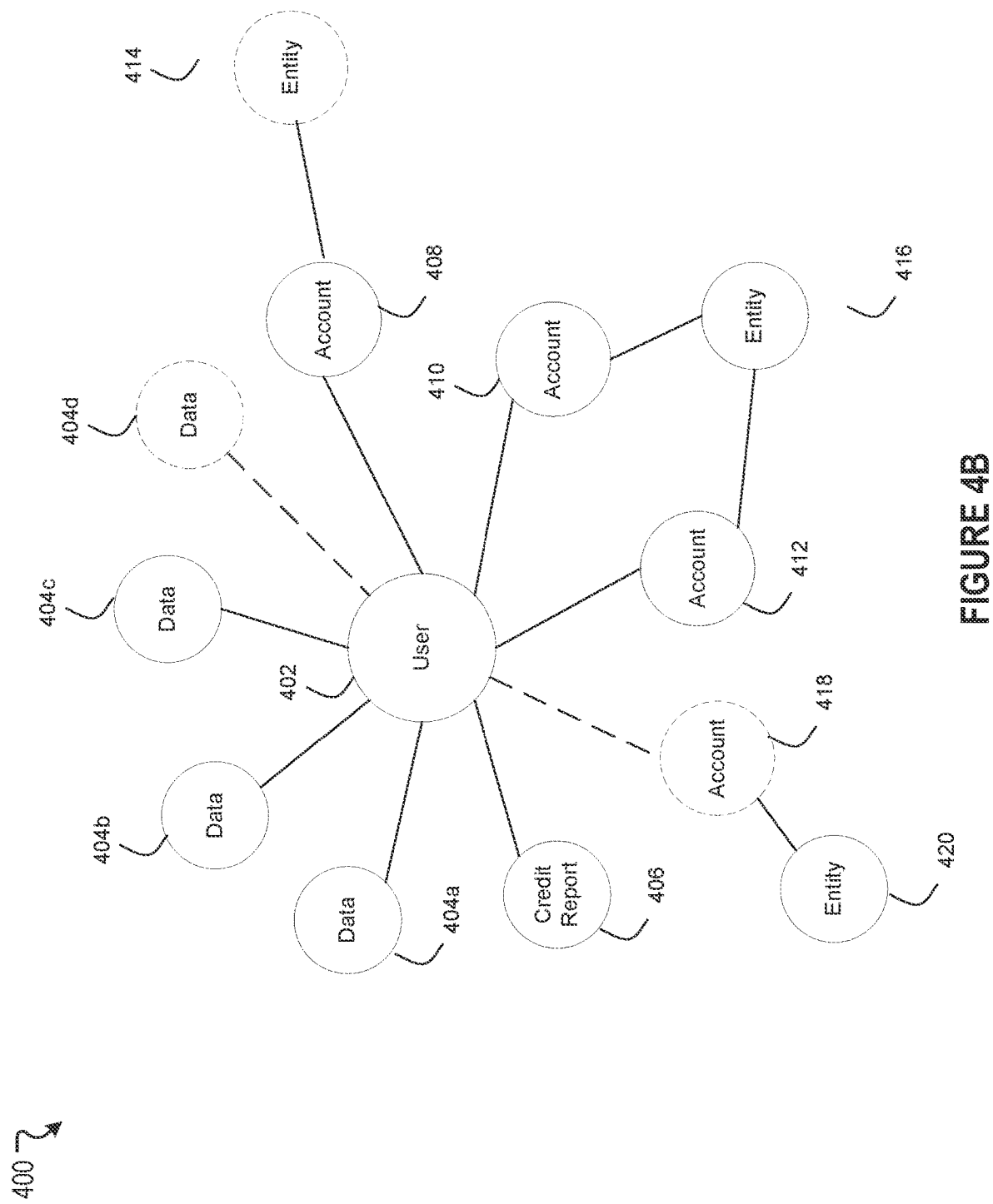
FIG. 4B illustrates an example graph, according to an embodiment of the present technology.

FIGS. 4A-4B illustrate an example of a graph 400 supporting authentication, according to an embodiment of the present technology. In FIG. 4A, the graph 400 can represent a user, identification information associated with the user, accounts of the user with various institutions, and other information. In some embodiments, the graph 400 can be a directed, heterogeneous knowledge graph representing information to facilitate authentication of the user with the authentication platform 102 and with different accounts of the user with various institutions. The graph 400 can include a node 402 representing the user. The node 402 can be connected to nodes 404a-404c that represent data that can be utilized to authenticate the user. For example, the nodes 404a-404c can represent various types of identification information (e.g., PII) associated with the user, such as name, mobile phone number, SSN, address, date of birth, and the like. Although three nodes representing identification information are shown for purposes of illustration, any number of nodes can be used in the graph 400 to represent identification information that is known about the user. The node 402 can be connected to a node 406 representing a credit report about the user provided by a credit reporting agency. In addition, the node 402 can be connected to nodes 408, 410, 412 representing different accounts of the user. For example, the accounts can include liability accounts, such as credit card accounts, mortgage accounts, student loan accounts, etc. Although three nodes representing accounts are shown for purposes of illustration, any number of accounts associated with the user can be reflected as nodes in the graph 400. The node 408 representing the associated account can be connected to a node 414 representing an institution, such as a first financial institution that is managing the account. Likewise, the nodes 410, 412 representing the associated accounts can be connected to a node 416 representing a second institution, such as a financial institution that is managing both of the accounts. The graph 400 also can include information representing authentication information that, when provided for an account with an institution, results in authentication of the user for the account. For example, the specific types of authentication information required to authenticate the user for an account with an institution can be reflected through an edge of the graph 400 that connects the node 402 representing the user and a node representing the account.

The graph 400 can be automatically regenerated or updated to reflect changes so that the graph 400 provides an accurate, up to date profile of the user and accounts of the user. For example, information obtained by the acquisition module 202 can indicate that information in the graph 400 warrants updating. In contrast to FIG. 4A, the graph 400 as shown in FIG. 4B reflects changes to the user and accounts of the user. For example, the graph 400 can generate an additional node 404d representing a new item of data (e.g., new type of PII) that can be utilized to authenticate the user. As another example, the node 414 can be updated to reflect a different institution that is managing the account represented by the node 408. For instance, the account may have been sold or otherwise transferred from the previous financial institution to a new financial institution. As yet another example, the graph 400 can include an additional node 418 representing a new account. The node 418 can be connected to a new node 420 representing a new institution (e.g., financial institution) that is managing the account represented by the node 418.

The institution authentication module 206 can utilize the graph 400 to authenticate the user for selected accounts with certain institutions. The graph 400 can be used to provide to a user a comprehensive listing of accounts with various institutions from which the user can select certain accounts to access protected data or share access to protected data to perform transactions. The institution authentication module 206 can receive from the user a selection of institutions with which to authenticate through the embedded component. The embedded component can prompt the user to select institutions with which to authenticate so that the user can access the protected data maintained by the institutions or provide access to the protected data to a third party.

Based on an indication by a user to obtain or share access to protected data associated with an account managed by a particular institution, the institution authentication module 206 can perform a graph search to locate the node representing the account. Once located in the graph, the node representing the account can indicate, for example, the account number, the type of account, and the interest rate applied to the account. The institution authentication module 206 also can traverse the graph by proceeding along an edge connecting the node representing the account to a node representing the institution that is managing the account. The node representing the institution can indicate, for example, the name of the institution.

Based on information reflected in the graph, the institution authentication module 206 can access a system, or hierarchy, of machine learning models exhibiting inheritance to perform authentication of the user for an account with an institution that is selected by the user. For example, the system of machine learning models can include large language models or generative pretrained transformers. The system of machine learning models can be maintained by the authentication platform 102 or an organization separate from 102 that provides access to trained machine learning models through APIs. For example, the machine learning models of the system can be adapted from one or more pretrained machine learning models offered by an organization that is separate from the authentication platform 102. The machine learning models can be adapted by fine tuning or prompt engineering performed by the institution authentication module 206. The machine learning models as adapted can have varying capabilities and focus in relation to authentication of users for different accounts managed by different institutions. In response to receipt of certain or all information maintained by the authentication platform 102 regarding the user (e.g., PII, account information, etc.), a machine learning model can provide authentication information (or authentication vector) that constitutes or specifies the particular types and formats of information required to authenticate the user for an account with an institution. The authentication information also can identify the true institution to which the information required for authentication should be provided.

Figure 5:
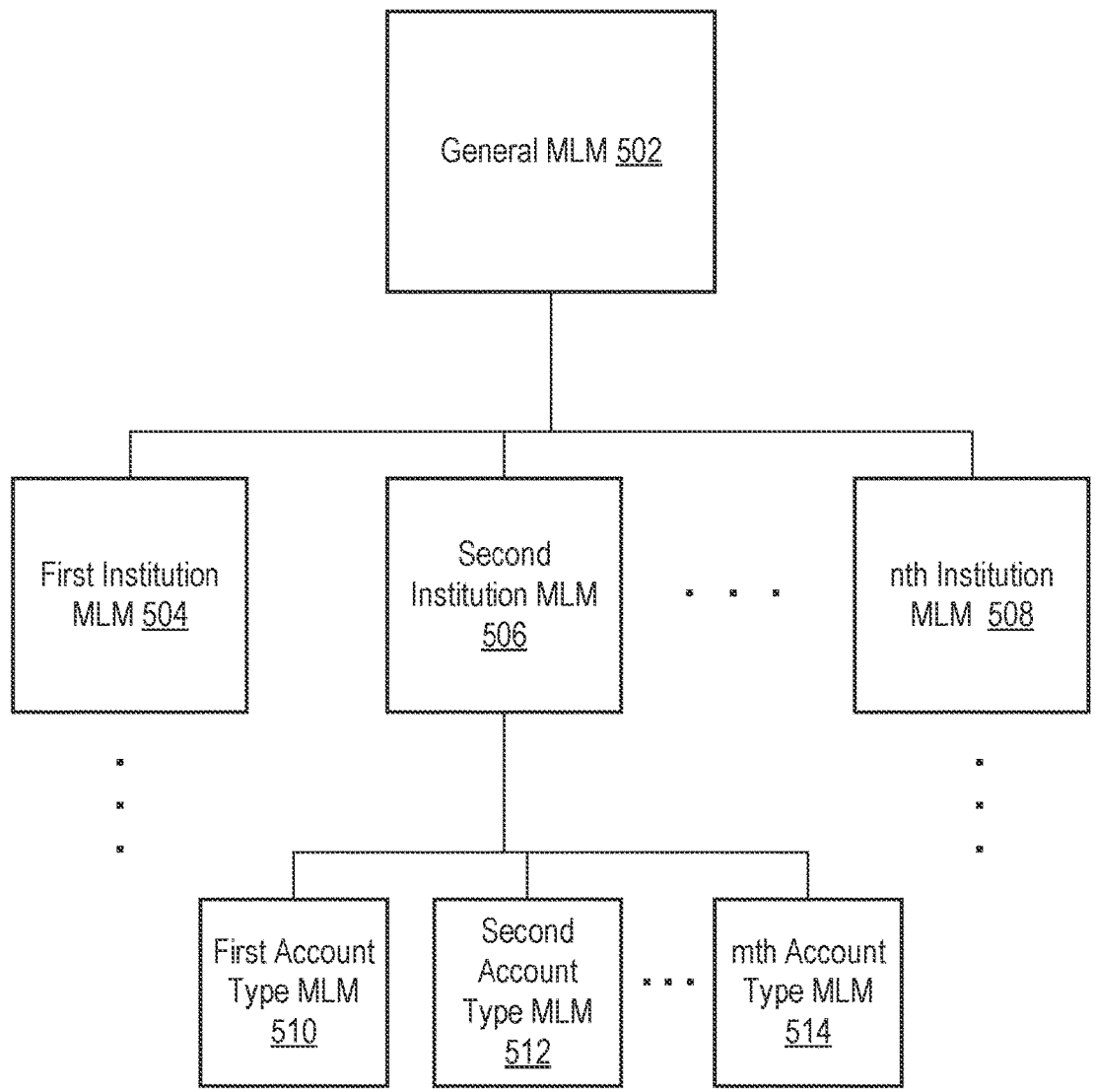
FIG. 5 illustrates an example system of machine learning models, according to an embodiment of the present technology.

FIG. 5 illustrates an example of a system 500 of machine learning models, according to an embodiment of the present technology. In some embodiments, the system 500 of machine learning models can include a general (or first) machine learning model (MLM) 502 in a first level that is trained to provide authentication information to authenticate a user for different types of accounts with various institutions. The general machine learning model 502 can provide authentication information to provide to an institution, such as certain PII of the user and other information about the account for which access is desired. In some embodiments, the system 500 of machine learning models also can include a next level (second level) of machine learning models that have been adapted to provide authentication information to authenticate a user for accounts with specific institutions. For example, in this level, a first institution machine learning model 504 can be configured to provide authentication information to authenticate a user for accounts with a first institution; a second institution machine learning model 506 can be configured to provide authentication information to authenticate a user for accounts with a second institution; and, an nth institution machine learning model 508 can be configured to provide authentication information to authenticate a user for accounts with an nth institution, where n is any value reflecting the number of institutions with which the authentication platform 102 can communicate to authenticate all users on the authentication platform 102. In this level, the first institution machine learning model 504 can be specially adapted to and tailored for authenticating with the first institution; the second institution machine learning model 506 is specially adapted to and tailored for authenticating with the second institution; and, the nth machine learning model 508 is specially adapted to and tailored for authenticating with the nth institution. For instance, the institutions can be various financial institutions, such as a particular bank, a particular mortgage servicer, a particular credit card issuer, a particular loan servicer, etc. The first institution machine learning model 504, the second institution machine learning model 506, and the third institution machine learning model 508 can inherit general capabilities from the general machine learning model 502. The first institution machine learning model 504, the second institution machine learning model 506, and the third institution machine learning model 508 can adapt and tailor these general capabilities for their associated institutions. For example, the first institution machine learning model 504, the second institution machine learning model 506, and the third institution machine learning model 508 can inherit capabilities associated with identification, expression, and provision of an account number for an account with an associated institution to authenticate the user. For instance, the first institution machine learning model 504 can inherit these capabilities, and further adapt and tailor these capabilities to identify and provide appropriate account numbers for authentication with the first institution. For example, the first institution may only accept account numbers provided in a particular format that is different from formats accepted by other institutions. The first institution machine learning model 504 can adapt and tailor capabilities inherited from the general machine learning model 502 to identify account numbers and provide the account numbers in the particular format required by the first institution.

In some embodiments, the system of machine learning models also can include a next level (third level) of machine learning models that have been adapted to provide authentication information to authenticate a user for particular types of accounts with each specific institution, such as a financial institution. For example, as shown in this level, the system 500 can include a plurality of machine learning models associated with different account types of the second institution. In this example, a first account type machine learning model 510 can be configured to provide authentication information to authenticate a user for a first type of account with the second institution; a second account type machine learning model 512 can be configured to provide authentication information to authenticate a user for a second type of account with the second institution; and, an mth account type machine learning model 514 can be configured to provide authentication information to authenticate a user for an mth type of account with the second institution, where m is any value reflecting the number of different types of accounts offered by the second institution. In this level, the first account type machine learning model 510 is specially adapted to and tailored for authenticating for the first type of account with the second institution; the second account type machine learning model 512 is specially adapted to and tailored for authenticating with the second type of account with the second institution; and, the mth account type machine learning model 514 is specially adapted to and tailored for authenticating with the mth type of account with the institution. For instance, the types of accounts with the second institution or other institution can include credit card accounts, student loan accounts, mortgage accounts, auto loan accounts, etc. Although machine learning models for different account types are associated with the second institution in FIG. 5 for purposes of illustration, the system 500 can also include machine learning models for different account types associated with the first institution or another institution.

While the foregoing examples relate to a system of machine learning models having three levels for purposes of illustration, a system of machine learning models in accordance with the present technology can have any suitable number of levels (e.g., two levels, four levels, five levels, etc.). Further, while the foregoing examples describe a system that increases focus from a general machine learning model at a first level, to machine learning models adapted to particular institutions at a second level, and to machine learning models adapted to specific types for accounts for a particular institution at a third level, a system of machine learning models in accordance with the present technology can include different narrowing focus over a plurality of levels. For example, the system can include increasing focus from a general machine learning model at a first level, to machine learning models adapted to particular types of accounts at a second level, and to machine learning models adapted to specific institutions for a particular type of account at a third level. Many variations are possible.

A system of machine learning models, like the system 500, can enable the institution authentication module 206 to determine an appropriate machine learning model to attempt authentication for a particular account with a particular institution selected by the user. When the user selects a particular account with a particular institution with which to authenticate, the institution authentication module 206 can hierarchically proceed through the system of machine learning models to find a machine learning model tailored to the selected account and institution. The identified machine learning model can be provided with relevant PII of the user and other information about the account. Based on the provided information, the machine learning model can provide authentication information identifying the information required for authentication with the selected account and institution. The institution authentication module 206 can provide the required information to authenticate the user for the selected account and institution. When the user is successfully authenticated with the selected account and institution, the authentication module 200 can obtain protected data of the account for the user to access and potentially share with other institutions. When the user is not successfully authenticated, the institution authentication module 206 can, for example, perform additional fine tuning or prompt engineering to adapt the capabilities of the machine learning model to output authentication information that will result in authentication. If the system of machine learning models does not include a machine learning model that is tailored for the selected account and institution at the third level of the system, the institution authentication module 206 can hierarchically proceed through the system of machine learning models to identify a machine learning model that is tailored to the institution at the second level of the system. If the machine learning model is identified, the machine learning model can be provided with relevant PII of the user and other information about the account. Based on the provided information, the machine learning model can provide authentication information identifying the information required for authentication with the selected account and institution, as described. If the system of machine learning models does not include a machine learning model that is tailored for the institution, the institution authentication module 206 instead can utilize the general machine learning model at the first level of the system. The general machine learning model can be provided with relevant PII of the user and other information about the account. Based on the provided information, the general machine learning model can provide authentication information identifying the information required for authentication with the selected account and institution, as described.

As just one example, assume the user desires to access protected data relating to a federal student loan managed by a particular loan servicer. The institution authentication module 206 can identify a machine learning model from the system that is tailored to provide authentication information to authenticate the user for federal student loans managed by the particular loan servicer. Upon receiving information associated with the user, the machine learning model can identify that the loan is a federal student loan based on an identifier of the federal student loan account. Further, the machine learning model can provide authentication information that includes a special prefix to be prepended to the identifier of the federal student loan account in order to properly authenticate the user in accordance with the requirements of the loan servicer. As another example, assume that the user desires access to protected data relating to a credit card account apparently sponsored by a retail store. The institution authentication module 206 can identify a machine learning model from the system that is tailored to provide authentication information to authenticate the user for credit card accounts sponsored by the retail store. Upon receiving information associated with the user, the machine learning model can determine that the retail store is merely a co-brand of the credit card account and that another bank is, in reality, the true lender managing the credit card account. Accordingly, in this example, the authentication information provided by the machine learning model can indicate not only the information required to authenticate the user but also the identity of the true institution, not the retail store, to which the information should be provided for authentication. The foregoing examples are merely illustrations. Other applications of the system of machine learning models and determinations of authentication information for authentication can be used in accordance with the present technology.

If the system of machine learning models does not include a machine learning model that is tailored for a selected account and institution at the third level of the system or a machine learning model that is tailored for the selected institution at the second level of the system, the institution authentication module 206 can newly adapt a machine learning model(s) that is accordingly tailored based on fine tuning or prompt engineering. The newly adapted machine learning model can be appropriately inserted into the hierarchy reflected in the system of machine learning models for future authentication tasks.

When the user is successfully authenticated, the authenticated status of the user can be maintained by the institution authentication module 206. For example, if a session with the embedded component was ended, or if the third-party application including the embedded component was closed or backgrounded on the mobile phone of the user, and the user again seeks to access or share access to protected data maintained in various accounts, the user need not re-enter identification information to be authenticated with the associated institutions. If the institutions require another authentication, the institution authentication module 206 can resubmit the authentication information associated with the user to authenticate the user for the desired accounts.

The institution authentication module 206 can store a record of a successful authentication. The institution authentication module 206 can create a record of the specific types of information that resulted in successful authentication. For example, the record may contain information regarding the particular type(s) of PII and other specific account information required by a particular institution for a particular type of account. For example, assume that the user was successfully authenticated for a credit card account with a particular bank. Assume further in this example that the user was successfully authenticated by providing to the bank the name of the user, the last four digits of the SSN of the user, and the first nine digits of the account number for the credit card account. In this example, the institution authentication module 206 can create a record indicating that, to authenticate a user for a credit card account with the bank, the name of the user, the last four digits of the SSN of the user, and the first ten digits of the account number for the credit card account are required. Records containing the specific information used for successful authentications can be maintained in a database or other knowledge repository managed by the 120. The database can accumulate records of successful authentications that have been previously facilitated through utilization of the system of machine learning models. When a request by any user seeks to access protected data associated with a particular type of account for a particular institution, the institution authentication module 206 can run a query against the database to quickly determine the specific types of information required for authentication. When the information required for authentication is found in the database, the system of machine learning models need not be utilized to determine authentication information for the particular type of account for the particular institution.

Figure 6A:
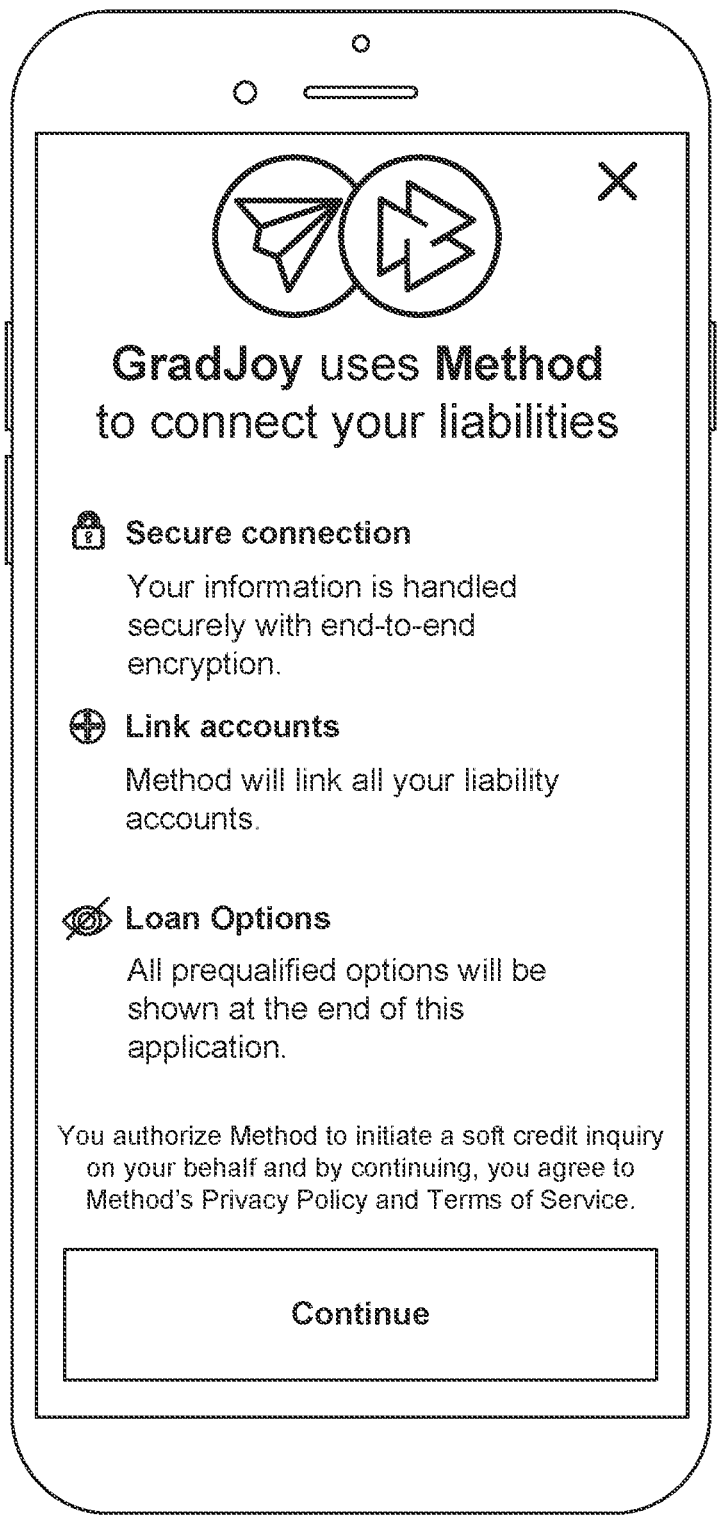
Figure 6B:
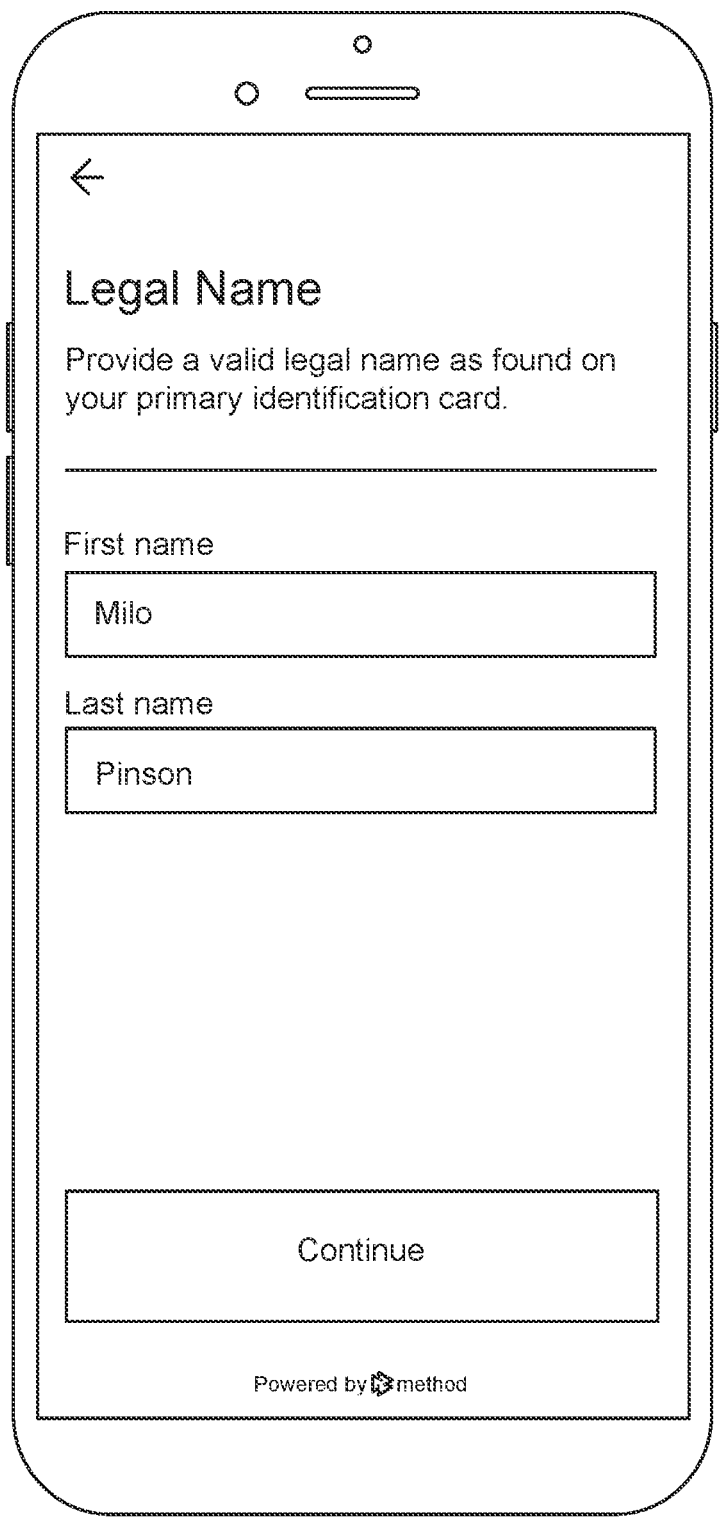
Figure 6C:
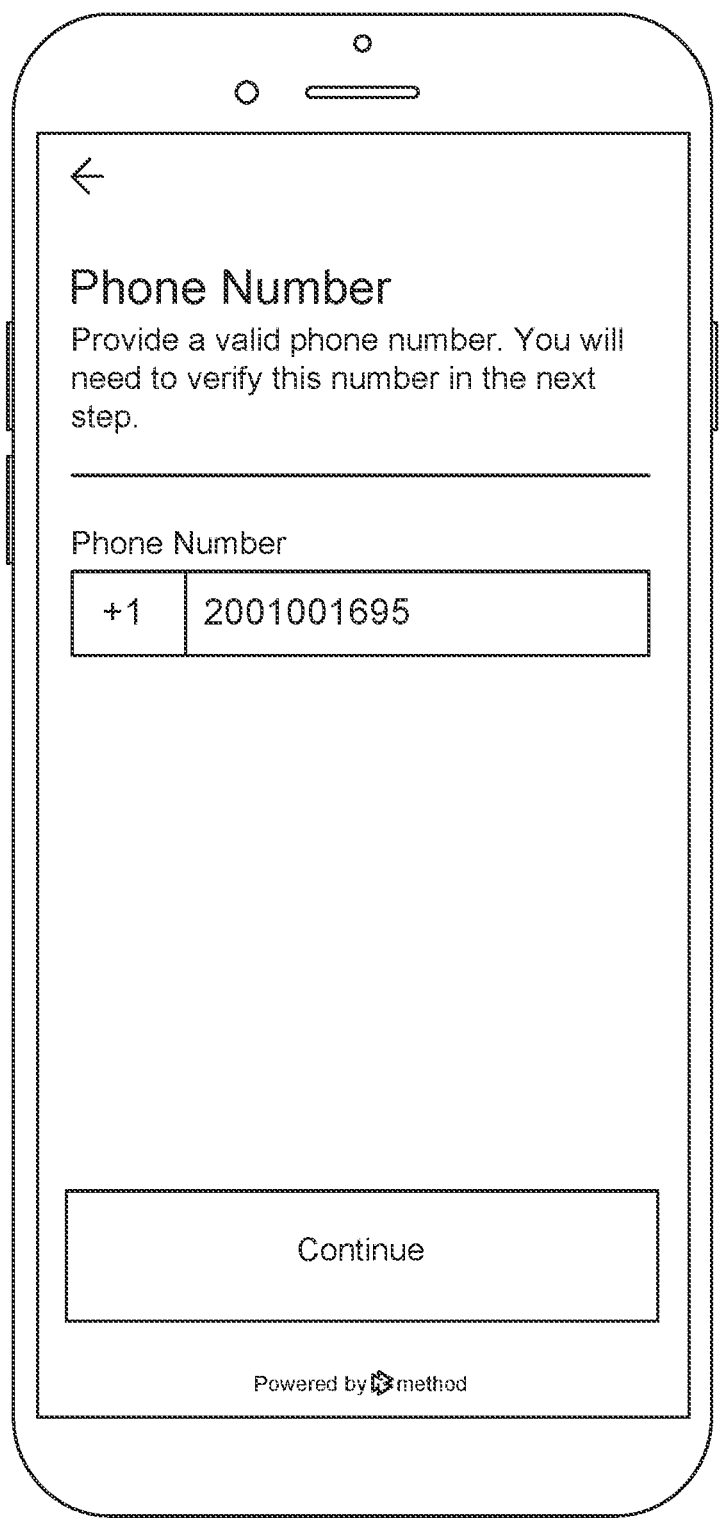

The interface module 208 can generate a series of views of an interface for presentation to the user. The interface can prompt the user for information, facilitate the authentication of the user with the authentication platform 102 and with one or more institutions maintaining protected data of the user, and securely provide access to the protected data. The interface can be presented through the embedded component that is integrated in or part of a larger application provided by a service provider in collaboration with the authentication platform 102, as discussed herein. FIGS. 6A-6K illustrate example views of an interface, according to an embodiment of the present technology. In some embodiments, the views of the interface can be generated by the interface module 208. The design and operation of the interface can be consistent with the described functionality of the authentication module 200. In FIG. 6A, a view 602 can inform the user about a collaboration between the service provider and the authentication platform 102. As shown, the service provider ("GradJoy") is a lender that engages with the authentication platform 102 to provide the user (or end user) access to protected data regarding accounts of the user and the capability to enter into transactions (e.g., payment rails) relating to the accounts. The user is provided with an overview of services offered by the service provider and certain disclosures within an authenticated environment of the service provider as reflected through the view 602. The service provider, through secure information handling with end-to-end encryption, can offer account linking, loan options, payment rails, etc. The view 602 also can prompt the user to agree to initiate an inquiry (e.g., soft credit inquiry) on behalf of the user. In addition, the view 602 can prompt the user to agree to certain terms, such as a privacy policy and terms of service, between the user and the authentication platform 102. For example, the terms can include a provision that permits the authentication platform 102 to contact a mobile network operator providing services to a mobile phone of the user and permits the mobile network operator to provide data of the user (e.g., PII) to the authentication platform 102 for authentication. The view 602 can include a button for the user to indicate consent and to advance. In FIG. 6B, a view 604 can prompt the user to enter the legal name of the user. The view 604 can include a button to advance. In FIG. 6C, a view 606 can prompt the user to enter a phone number. The view 606 can include a button to advance. After the user enters a phone number and selects the button, back-end processes of the authentication platform 102 can be triggered so that the user can be authenticated with the authentication platform 102 and for accounts with various institutions without the entry by the user of any additional identification information.

Figure 6D:
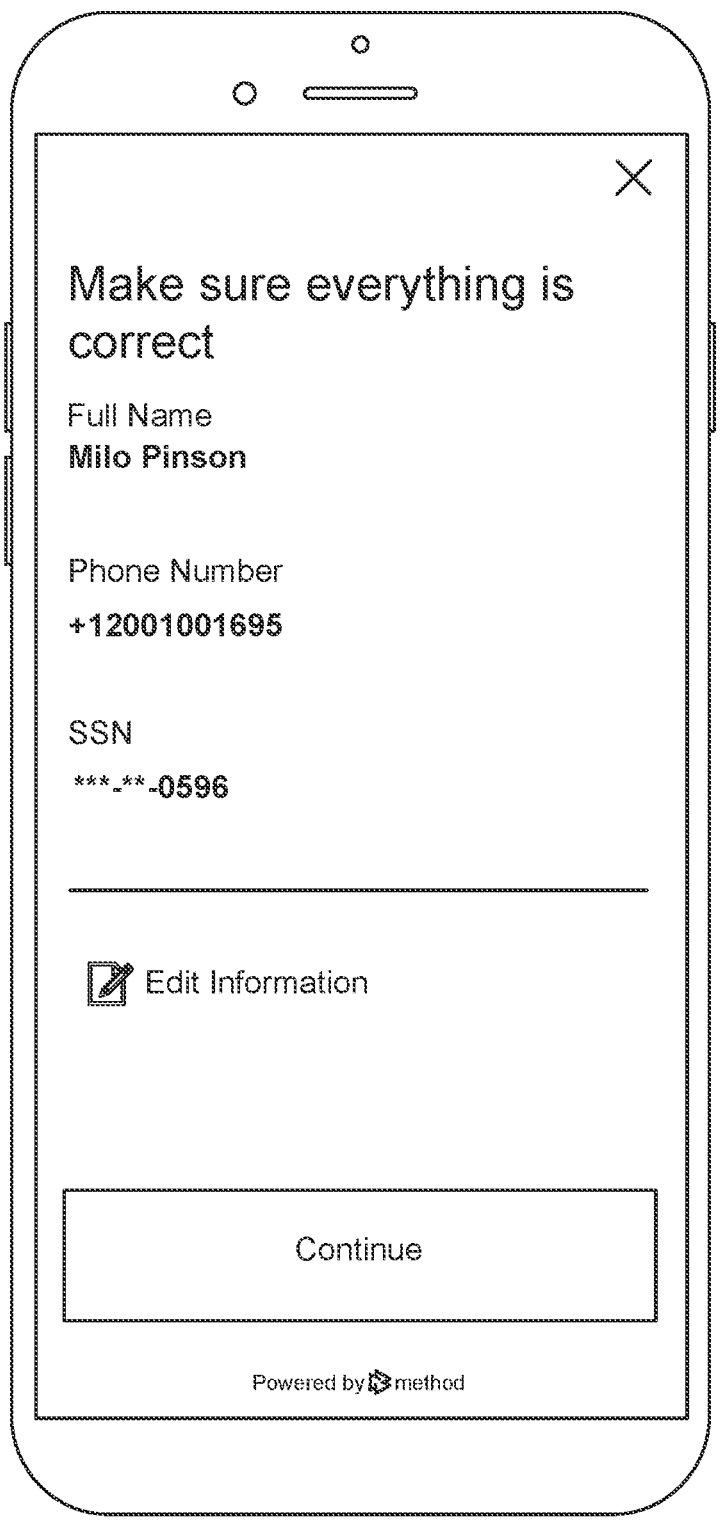

Verification or silent network authentication (SNA) can be initiated with a relevant mobile network operator to authenticate the user with the authentication platform 102. In addition, telecommunication related fraud detection technologies (e.g., SIM swap, porting, etc.) can be initiated to authenticate the user. If the user can be authenticated with the authentication platform 102, a data pre-fill technology can be initiated to pre-fill certain types of information for verification or modification by the user. In FIG. 6D, a view 608 can display the full name, phone number, and a partial SSN of the user based on a pre-fill technology. The view 608 includes an option for the user to edit the displayed information. The view 608 also can include a button for the user to confirm the correctness of the displayed or edited information about the user and to advance.

Figure 6F:
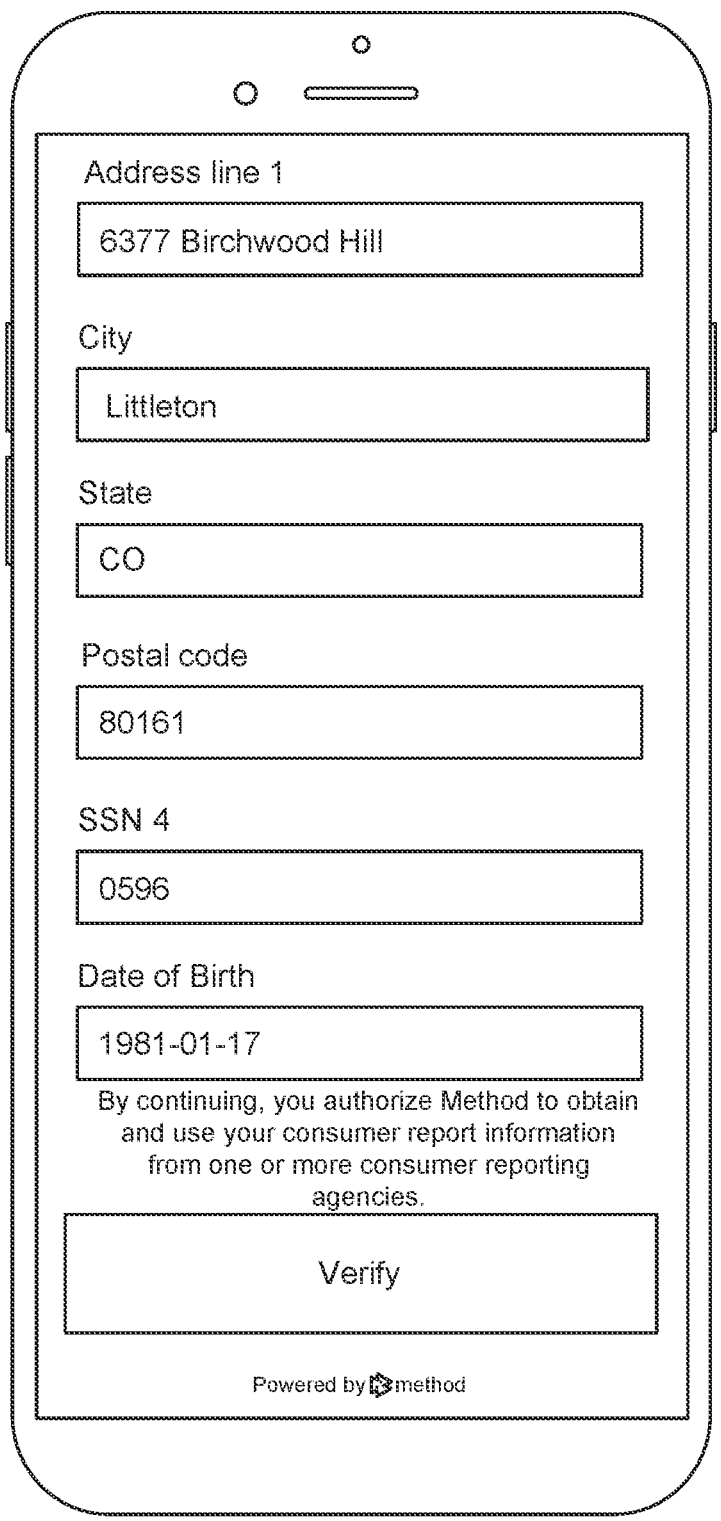

In FIGS. 6E-6F, views 610, 612 reflect vertical scrolling of the interface. The views 610, 612 can display the first name, last name, phone number, address, partial SSN, and date of birth based on a pre-fill technology. The views 610, 612 can include a button for the user to verify the correctness of the displayed information or to edit the displayed information. In addition, the views 610, 612 can include the button to permit the authentication platform 102 to obtain (e.g., soft-credit inquiry) and use information in a consumer report from one or more consumer reporting agencies.

Figure 6G:
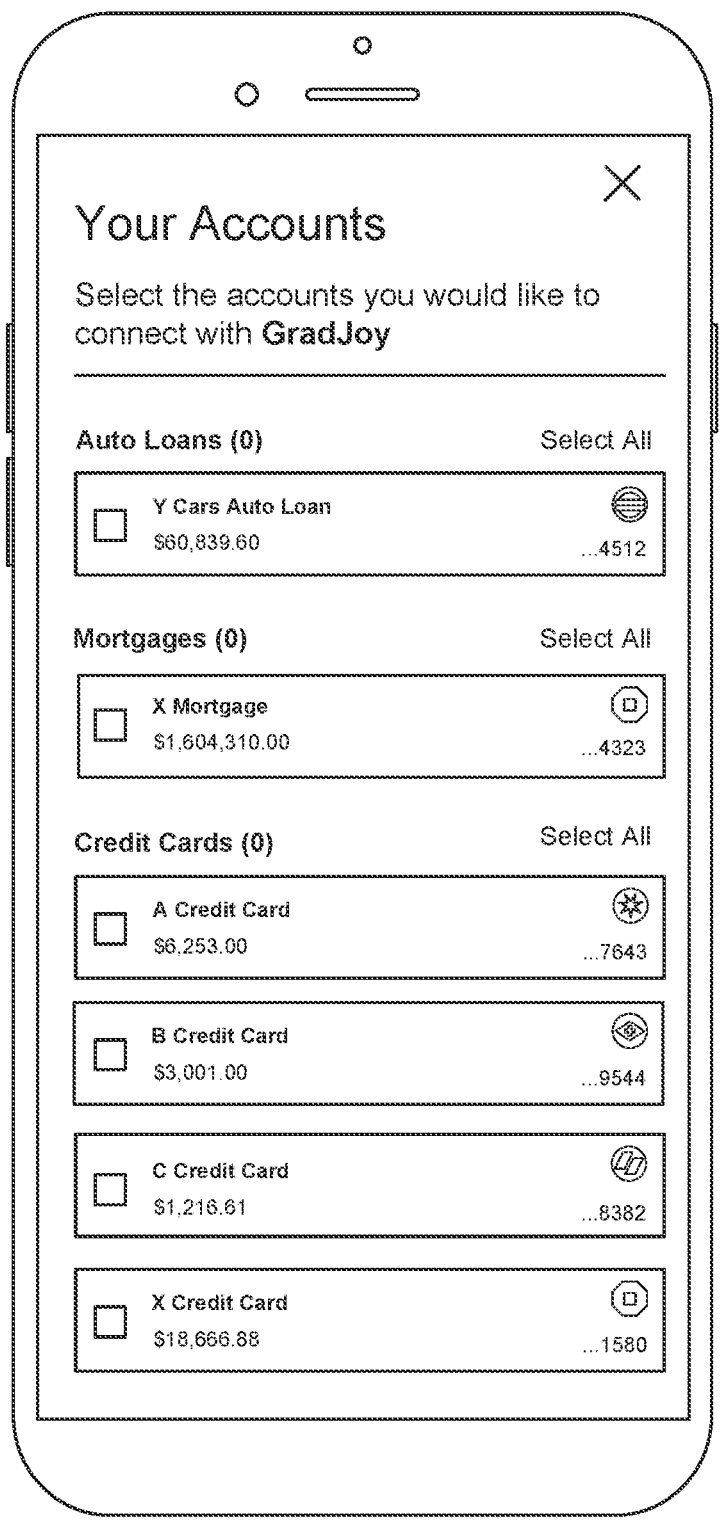

In FIG. 6G, a view 614 can provide a listing of various accounts of the user with different institutions. The listing can include headings to indicate grouping of different types of accounts. For example, as shown, accounts relating to auto loans, mortgages, and credit cards are grouped separately. A displayed container associated with each account can include various information, such as the name of the institution associated with the account, the type of account, the balance on the account, a logo of the institution, and an identifier of the account. The displayed container associated with each account also can include a selectable box to receive a possible selection (e.g., through a touch gesture to the box) of the account by the user. The user can select accounts that the user would like to be accessible to the service provider. The view 614 can include a button for the user to submit the selection of accounts. In some embodiments (not shown), the view 614 can provide further controls on access to each account. For example, the view 614 can allow the user to specify one type of protected data in the account to share with the service provider and specify a second type of protected data in the account that should not be shared with the service provider. As another example, the view 614 can allow the user to specify a limited duration of time in which a type of protected data can be accessible to the service provider. Many variations are possible.

Figure 6H:
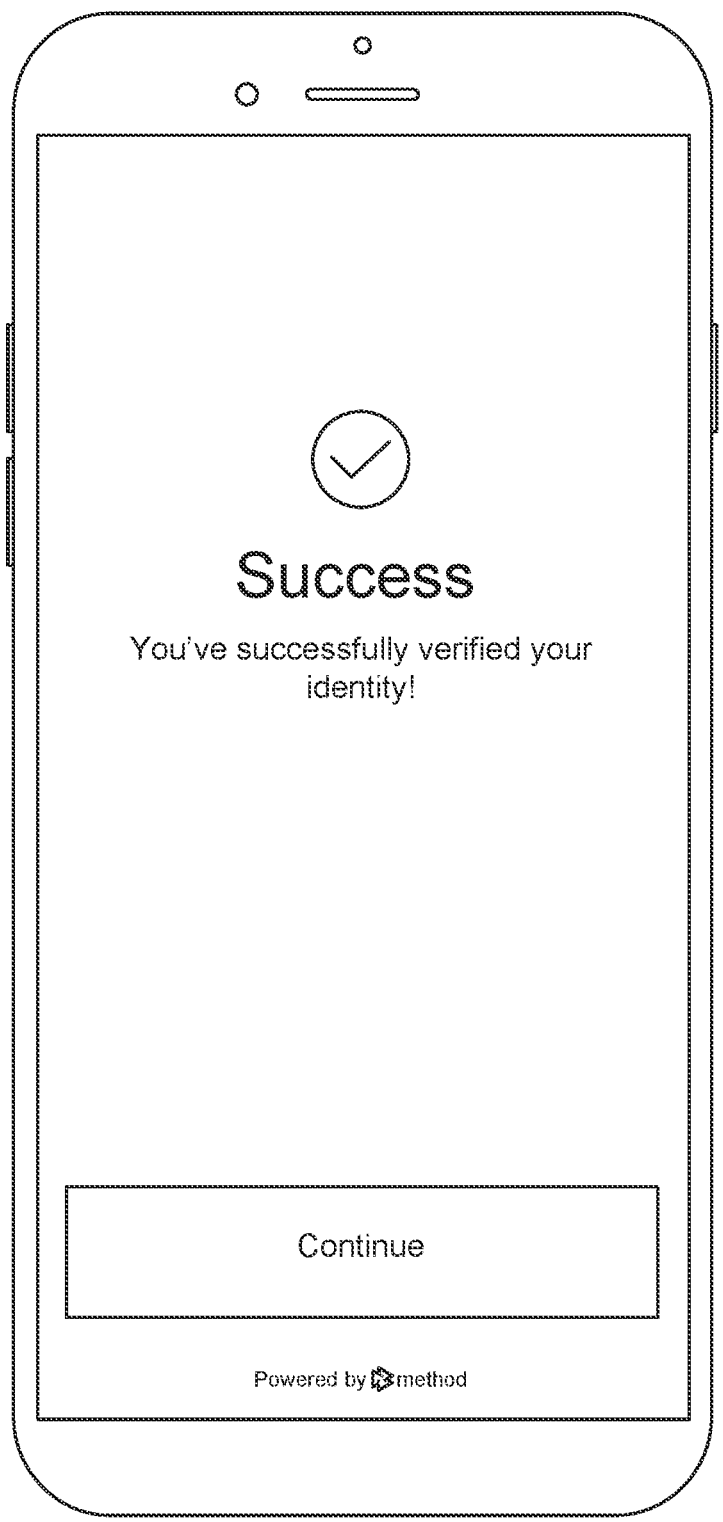
Figure 6I:
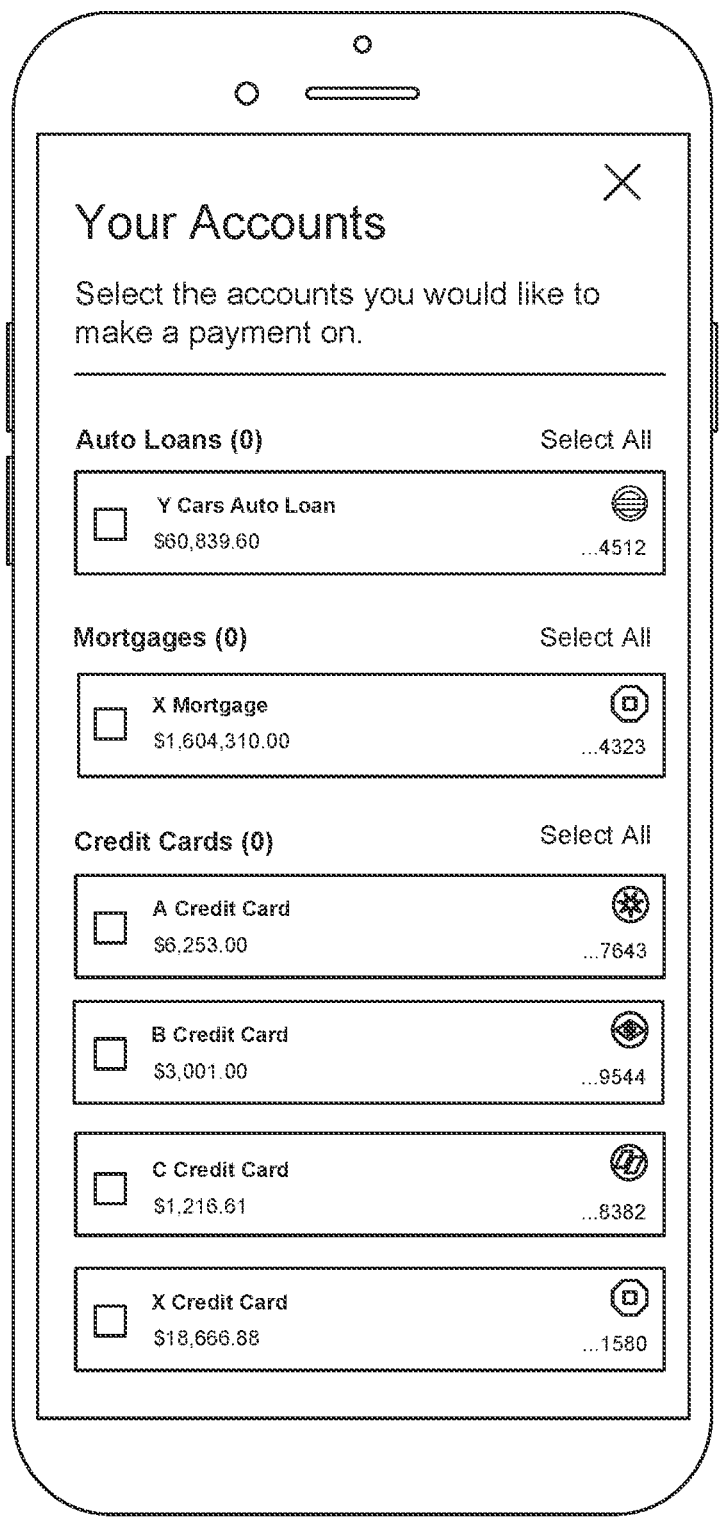
Figure 6J:
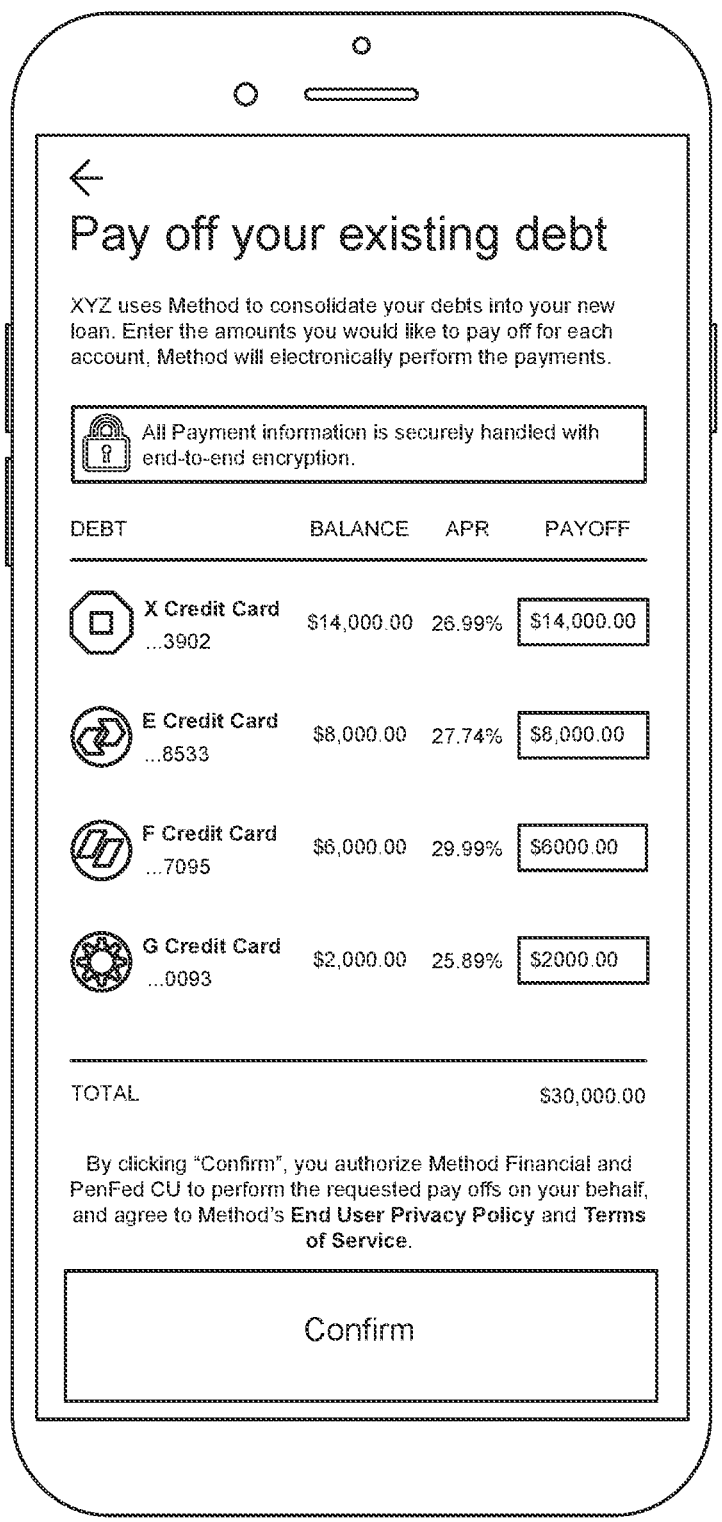
Figure 6K:
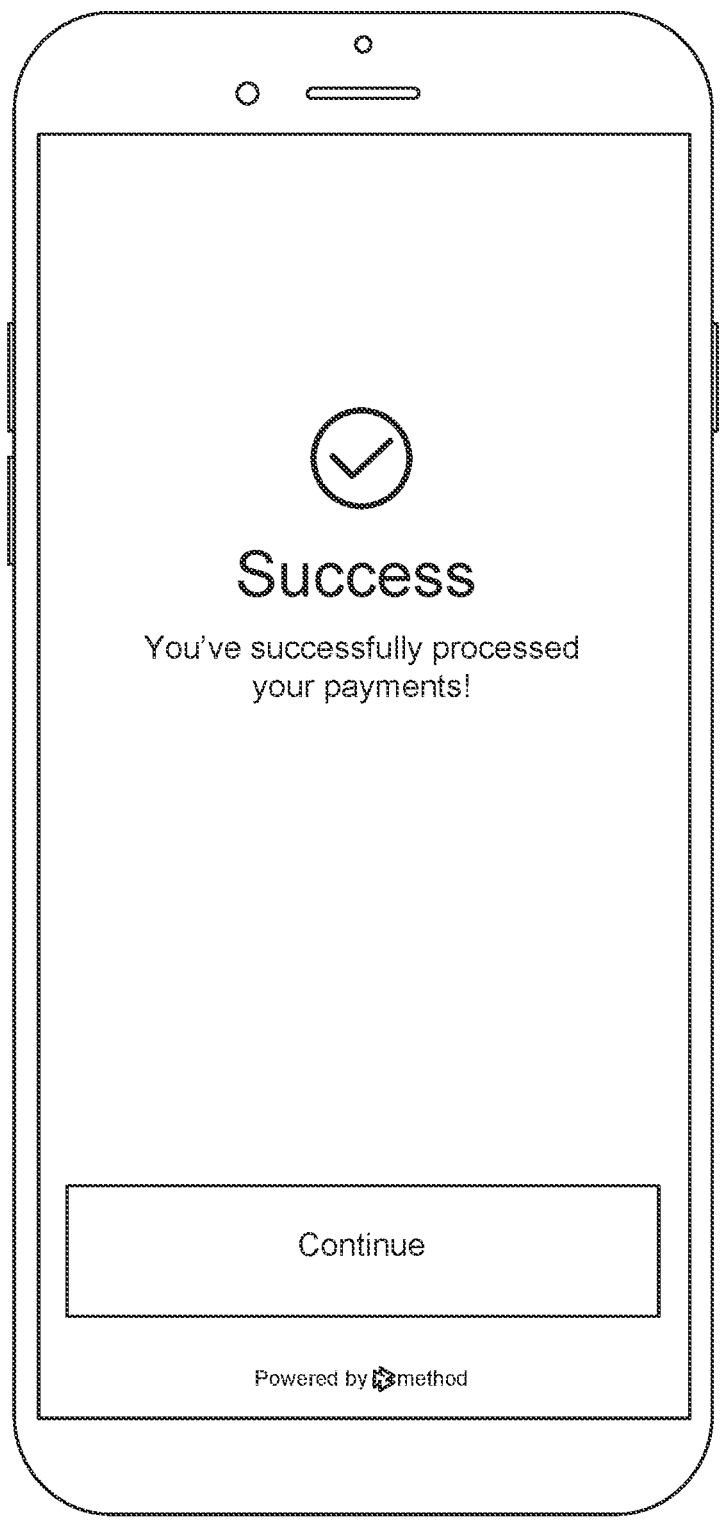

The authentication platform 102 can transmit certain PII and account number information to various institutions (e.g., financial institutions, core banking providers) associated with the accounts selected by the user to authenticate the user. In FIG. 6H, a view 616 can indicate that the user has been successfully authenticated with the institutions associated with the selected accounts. The view 616 can include a button to advance. Upon authentication with the institutions, the authentication platform 102 can retrieve comprehensive real-time data, such as balances payoff dates, APRs, etc. In FIG. 6I, a view 618 can display the comprehensive real-time data, such as balances, payoff dates, APRs, etc. for the selected accounts with various institutions. The view 618 can prompt the user for a selection of accounts for which the user would like to initiate payment through the service provider. In FIG. 6J, a view 620 can provide a listing of the accounts with different institutions for which the user would like to initiate payment through the service provider. The view 620 can prompt the user to enter the amount (e.g., dollar value) to pay off for each account. The view 620 can include a total amount to be paid off for all of the listed accounts. The view 620 can include an indication that the user authorizes the authentication platform 102 and a financial institution (e.g., "PenFed CU") associated with the service provider to perform the pay offs on behalf of the user and that the user agrees to terms (e.g., end user privacy policy, terms of service) of the authentication platform 102. The view 620 can include a button for the user to accordingly authorize and agree. After selection of the button, the authentication platform 102 can initiate OFAC/AML checks on the user. If the user passes the checks, the authentication platform 102 can cause payments to be made for the accounts selected by the user. In some embodiments, all PII of the user and tradeline data associated with the user can be deleted by the authentication platform 102. In some embodiments, if the user has selected the authentication platform 102 to perform ongoing bill pay services, the PII of the user and trade line data can be retained by the authentication platform 102 until the user opts out of the services or otherwise expressly informs the authentication platform 102 to delete the data.

FIG. 7A illustrates an example method 700, according to an embodiment of the present technology. It should be understood that there can be additional, fewer, or alternative steps performed in similar or alternative orders, or in parallel, based on the various features and embodiments discussed herein unless otherwise stated. At block 702, the method 700 can receive predetermined types of identification information in response to a prompt presented through an interface to a user. At block 704, the method 700 can, based in part on the predetermined types of identification information, cause authentication of the user for a selection of accounts with a plurality of institutions maintaining protected data of the user in a plurality of secure networks.

Figure 7B:
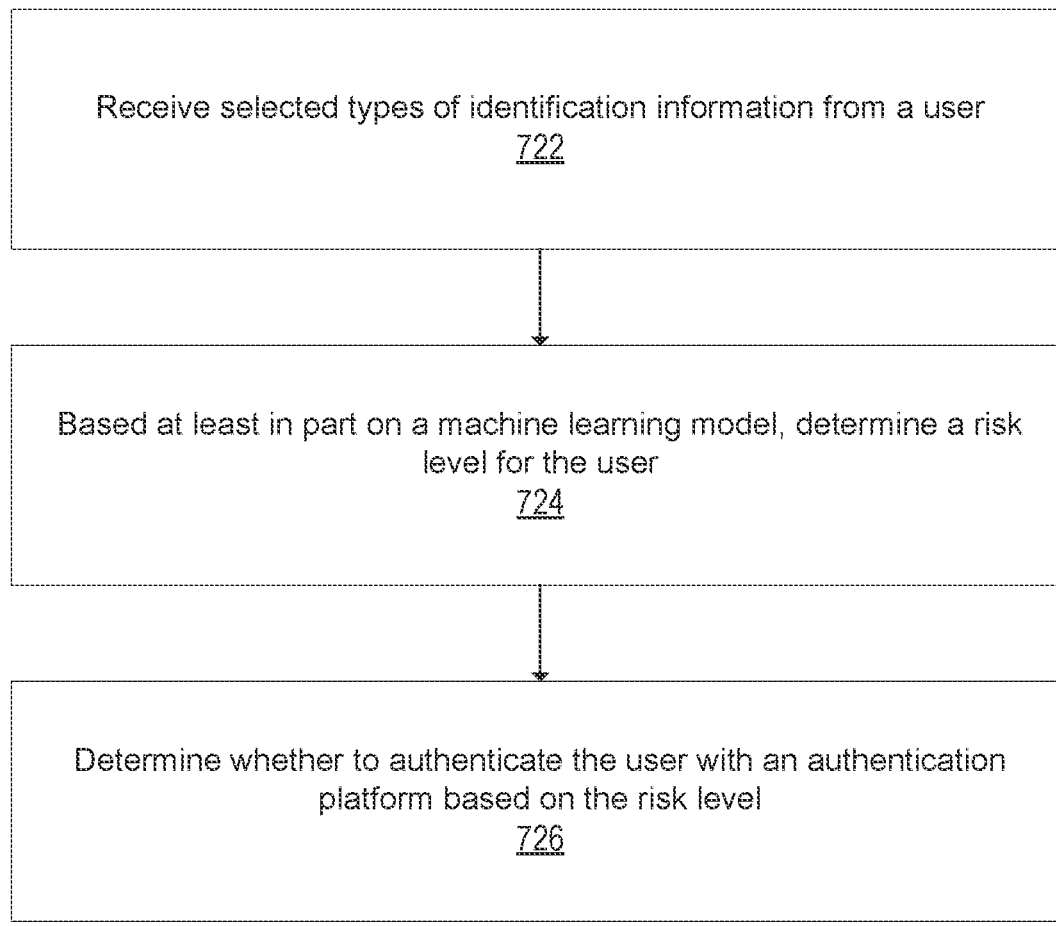

FIG. 7B illustrates an example method 720, according to an embodiment of the present technology. It should be understood that there can be additional, fewer, or alternative steps performed in similar or alternative orders, or in parallel, based on the various features and embodiments discussed herein unless otherwise stated. At block 722, the method 720 can receive selected types of identification information from a user. At block 724, the method 720 can, based at least in part on a machine learning model, determine a risk level for the user. At block 726, the method 720 can determine whether to authenticate the user with an authentication platform based on the risk level.

FIG. 7C illustrates an example method 740, according to an embodiment of the present technology. It should be understood that there can be additional, fewer, or alternative steps performed in similar or alternative orders, or in parallel, based on the various features and embodiments discussed herein unless otherwise stated. At block 742, the method 740 can select a machine learning model from a system of machine learning models based on an account with an institution selected by a user. At block 744, the method 740 can generate authentication information based on the machine learning model. At block 746, the method 740 can provide the authentication information to the institution to authenticate the user for the account with the institution.

Figure 8:
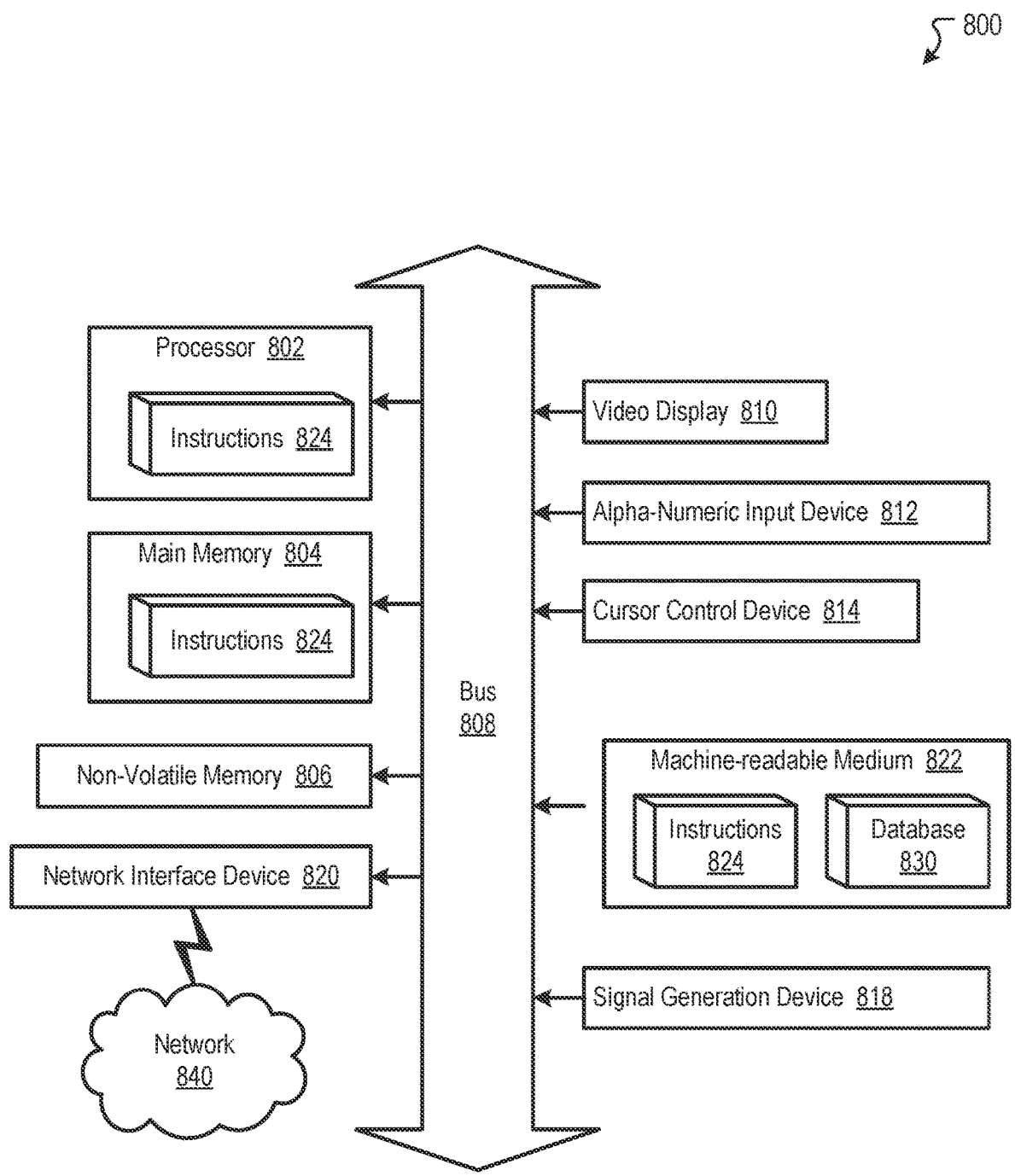
FIG. 8 illustrates an example computer system or computing device, according to an embodiment of the present technology.

FIG. 8 illustrates an example of a computer system 800 that may be used to implement one or more of the embodiments of the present technology. For example, the computer system 800 can be implemented as a server or server system of the authentication platform 102, or the service provider 120, the mobile network operator 108, the data sources 110, the agencies 112, and the institutions 114. The computer system 800 can be included in a wide variety of local and remote machine and computer system architectures and in a wide variety of network and computing environments that can implement the functionalities of the present technology. The computer system 800 includes sets of instructions 824 for causing the computer system 800 to perform the functionality, features, and operations discussed herein. The computer system 800 may be connected (e.g., networked) to other machines and/or computer systems. In a networked deployment, the computer system 800 may operate in the capacity of a server or a client machine in a client-server network environment, or as a peer machine in a peer-to-peer (or distributed) network environment.

The computer system 800 includes a processor 802 (e.g., a central processing unit (CPU), a graphics processing unit (GPU), or both), a main memory 804, and a nonvolatile memory 806 (e.g., volatile RAM and non-volatile RAM, respectively), which communicate with each other via a bus 808. In some embodiments, the computer system 800 can be a desktop computer, a laptop computer, personal digital assistant (PDA), or mobile phone, for example. In one embodiment, the computer system 800 also includes a video display 810, an alphanumeric input device 812 (e.g., a keyboard), a cursor control device 814 (e.g., a mouse), a signal generation device 818 (e.g., a speaker) and a network interface device 820.

In one embodiment, the video display 810 includes a touch sensitive screen for user input. In one embodiment, the touch sensitive screen is used instead of a keyboard and mouse. A machine-readable medium 822 can store one or more sets of instructions 824 (e.g., software) embodying any one or more of the methodologies, functions, or operations described herein. The instructions 824 can also reside, completely or at least partially, within the main memory 804 and/or within the processor 802 during execution thereof by the computer system 800. The instructions 824 can further be transmitted or received over a network 840 via the network interface device 820. In some embodiments, the machine-readable medium 822 also includes a database 830.

The processor 802 can be, for example, a hardware based integrated circuit (IC) or any other suitable processing device configured to run or execute a set of instructions or a set of codes. For example, the processor 802 can include a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC), a graphics processing unit (GPU), a neural network processor (NNP), and/or the like.

The network 840, which can represent the network 118, can be, for example, a digital telecommunication network of servers and/or computing devices. The servers and/or computing device on the network can be connected via one or more wired or wireless communication networks (not shown) to share resources such as, for example, data storage and/or computing power. The wired or wireless communication networks between servers and/or computing devices of the network can include one or more communication channels, for example, a radio frequency (RF) communication channel(s), an extremely low frequency (ELF) communication channel(s), an ultra-low frequency (ULF) communication channel(s), a low frequency (LF) communication channel(s), a medium frequency (MF) communication channel(s), an ultra-high frequency (UHF) communication channel(s), an extremely high frequency (EHF) communication channel(s), a fiber optic communication channel(s), an electronic communication channel(s), a satellite communication channel(s), and/or the like. The network can be, for example, the Internet, an intranet, a local area network (LAN), a wide area network (WAN), a metropolitan area network (MAN), a worldwide interoperability for microwave access network (WiMAX®), any other suitable communication system, and/or a combination of such networks.

The network can use standard communications technologies and protocols. Thus, the network can include links using technologies such as Ethernet, 802.11, worldwide interoperability for microwave access (WiMAX®), 3G, 4G, 5G, CDMA, GSM, LTE, digital subscriber line (DSL), etc. Similarly, the networking protocols used on the network can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

Volatile RAM may be implemented as dynamic RAM (DRAM), which requires power continually in order to refresh or maintain the data in the memory. Non-volatile memory is typically a magnetic hard drive, a magnetic optical drive, an optical drive (e.g., a DVD RAM), or other type of memory system that maintains data even after power is removed from the system. The non-volatile memory 806 may also be a random access memory. The non-volatile memory 806 can be a local device coupled directly to the rest of the components in the computer system 800. A non-volatile memory that is remote from the system, such as a network storage device coupled to any of the computer systems described herein through a network interface such as a modem or Ethernet interface, can also be used.

While the machine-readable medium 822 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present technology. Examples of machine-readable media (or computer-readable media) include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

In general, routines executed to implement the embodiments of the invention can be implemented as part of an operating system or a specific application, component, program, object, module, or sequence of instructions referred to as "programs" or "applications." For example, one or more programs or applications can be used to execute any or all of the functionality, techniques, and processes described herein. The programs or applications typically comprise one or more instructions set at various times in various memory and storage devices in the machine and that, when read and executed by one or more processors, cause the computing system 800 to perform operations to execute elements involving the various aspects of the embodiments described herein.

The executable routines and data may be stored in various places, including, for example, ROM, volatile RAM, non-volatile memory, and/or cache memory. Portions of these routines and/or data may be stored in any one of these storage devices. Further, the routines and data can be obtained from centralized servers or peer-to-peer networks. Different portions of the routines and data can be obtained from different centralized servers and/or peer-to-peer networks at different times and in different communication sessions, or in the same communication session. The routines and data can be obtained in entirety prior to the execution of the applications. Alternatively, portions of the routines and data can be obtained dynamically, just in time, when needed for execution. Thus, it is not required that the routines and data be on a machine-readable medium in entirety at a particular instance of time.

While embodiments have been described fully in the context of computing systems, those skilled in the art will appreciate that the various embodiments are capable of being distributed as a program product in a variety of forms, and that the embodiments described herein apply equally regardless of the particular type of machine or computer-readable media used to actually affect the distribution.

Some embodiments described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java™, JavaScript, C++, and/or other programming languages and software development tools. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java™, C++, etc.) or other suitable programming languages and/or development tools. Additional examples of computer code include, but are not limited to, control signals, encrypted code, and compressed code.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description or discussed herein. In other instances, functional block diagrams and flow diagrams are shown to represent data and logic flows. The components of block diagrams and flow diagrams (e.g., modules, engines, blocks, structures, devices, features, etc.) may be variously combined, separated, removed, reordered, and replaced in a manner other than as expressly described and depicted herein.

Reference in this specification to "one embodiment," "an embodiment," "other embodiments," "another embodiment," "in some embodiments," "in various embodiments," "in an example," "in one implementation," "in one instance," or the like means that a particular feature, design, structure, or characteristic described in connection with the embodiment is included in at least one embodiment of the technology. The appearances of, for example, the phrases "according to an embodiment," "in one embodiment," "in an embodiment," "in some embodiments," "in various embodiments," or "in another embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described which may be preferences or requirements for some embodiments but not other embodiments.

Although embodiments have been described with reference to specific exemplary embodiments, it will be evident that the various modifications and changes can be made to these embodiments. Accordingly, the specification and drawings are to be regarded in an illustrative sense rather than in a restrictive sense. The foregoing specification provides a description with reference to specific exemplary embodiments. It will be evident that various modifications can be made thereto without departing from the broader spirit and scope as set forth in the following claims. The specification and drawings are, accordingly, to be regarded in an illustrative sense rather than a restrictive sense.

Although some of the drawings illustrate a number of operations or method steps in a particular order, steps that are not order dependent may be reordered and other steps may be combined or omitted. While some reordering or other groupings are specifically mentioned, others will be apparent to those of ordinary skill in the art and so do not present an exhaustive list of alternatives. Moreover, it should be recognized that the stages could be implemented in hardware, firmware, software, or any combination thereof.

It should also be understood that a variety of changes may be made without departing from the essence of the invention. Such changes are also implicitly included in the description. They still fall within the scope of this invention. It should be understood that this technology is intended to yield a patent covering numerous aspects of the invention, both independently and as an overall system, and in method, computer readable medium, and apparatus modes.

Further, each of the various elements of the invention and claims may also be achieved in a variety of manners. This technology should be understood to encompass each such variation, be it a variation of an embodiment of any apparatus (or system) embodiment, a method or process embodiment, a computer readable medium embodiment, or even merely a variation of any element of these.

Further, the use of the transitional phrase "comprising" is used to maintain the "open-end" claims herein, according to traditional claim interpretation. Thus, unless the context requires otherwise, it should be understood that the term "comprise" or variations such as "comprises" or "comprising," are intended to imply the inclusion of a stated element or step or group of elements or steps, but not the exclusion of any other element or step or group of elements or steps. Such terms should be interpreted in their most expansive forms so as to afford the applicant the broadest coverage legally permissible in accordance with the following claims.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the technology of the embodiments of the invention is intended to be illustrative, but not limiting, of the scope of the invention, which is set forth in the following claims.

What is claimed is:

1. A computer-implemented method comprising:
receiving, by a computing system, identification information from a user;
based at least in part on the identification information and a machine learning model, determining, by the computing system, a risk level of the user;
determining, by the computing system, whether the user can be authenticated with an authentication platform based on the risk level; and
based on authentication of the user by the authentication platform, automatically enabling, by the computing system, authentication of the user for accounts with a plurality of institutions maintaining protected data of the user in a plurality of secure networks by obtaining authentication information from at least one machine learning model in a system,
the system comprising a plurality of machine learning models at a plurality of levels that provide authentication information, the system comprising a general machine learning model at a first level, machine learning models at a second level adapted to particular types of accounts, and machine learning models at a third level adapted to specific institutions for a particular type of account.

2. The computer-implemented method of claim 1, wherein the determining a risk level for the user comprises:
generating an aggregate risk score based on a risk scoring technique; and
determining the risk level based on the aggregate risk score.

3. The computer-implemented method of claim 2, wherein the generating an aggregate risk score based on a risk scoring technique comprises:
determining a score for a feature provided by a data source;
determining a weight for the feature, the weight generated by at least one of the machine learning model or a deterministic model;
combining the score for the feature and the weight for the feature to generate a component score for a term corresponding with the feature; and
aggregating component scores of terms corresponding to selected features to generate the aggregate risk score.

4. The computer-implemented method of claim 3, wherein the selected features are selected by the authentication platform from information provided by at least one of a mobile network provider, the data source, and an agency that are separate from the authentication platform.

5. The computer-implemented method of claim 1, wherein the determining a risk level for the user comprises:
applying features associated with the user to the machine learning model, the machine learning model trained to generate the risk level.

6. The computer-implemented method of claim 5, wherein the features associated with the user are provided by at least one of a mobile network provider, a data source, and an agency that are separate from the authentication platform.

7. The computer-implemented method of claim 5, wherein training data to train the machine learning model comprises features associated with an individual and a label indicating a risk level associated with the individual, the features and the label provided by a data source that is separate from the authentication platform.

8. The computer-implemented method of claim 7, wherein the label is based on at least one of: an appearance of the user in a regulatory sanction list, a mobile phone number of the user being associated with an IP address linked to a country sanctioned by Office of Foreign Asset Control (OFAC), and an indication that the user is a politically exposed person (PEP).

9. The computer-implemented method of claim 1, wherein automatically enabling authentication of the user for accounts with a plurality of institutions comprises:
hierarchically proceeding through the system to identify a machine learning model at the third level that is specific for a selected account and institution.

10. The computer-implemented method of claim 1, further comprising:
based on authentication with the plurality of institutions, accessing real-time data of the accounts with the plurality of institutions; and
causing display of the real-time data through an application running on a client computing device of the user.

11. A system comprising:
at least one processor; and
a memory storing instructions that, when executed by the at least one processor, cause the system to perform operations comprising:
receiving identification information from a user;
based at least in part on the identification information and a machine learning model, determining a risk level of the user;
determining whether the user can be authenticated with an authentication platform based on the risk level; and
based on authentication of the user by the authentication platform, automatically enabling authentication of the user for accounts with a plurality of institutions maintaining protected data of the user in a plurality of secure networks by obtaining authentication information from at least one machine learning model in a system,
the system comprising a plurality of machine learning models at a plurality of levels that provide authentication information, the system comprising a general machine learning model at a first level, machine learning models at a second level adapted to particular types of accounts, and machine learning models at a third level adapted to specific institutions for a particular type of account.

12. The system of claim 11, wherein the determining a risk level for the user comprises:
generating an aggregate risk score based on a risk scoring technique; and
determining the risk level based on the aggregate risk score.

13. The system of claim 12, wherein the generating an aggregate risk score based on a risk scoring technique comprises:
determining a score for a feature provided by a data source;
determining a weight for the feature, the weight generated by at least one of the machine learning model or a deterministic model;
combining the score for the feature and the weight for the feature to generate a component score for a term corresponding with the feature; and
aggregating component scores of terms corresponding to selected features to generate the aggregate risk score.

14. The system of claim 13, wherein the weight generated by the machine learning model is reconfigured to fall within a predetermined range that constrains the values of the weight.

15. The system of claim 13, wherein the selected features are selected by the authentication platform from information provided by at least one of a mobile network provider, the data source, and an agency that are separate from the authentication platform.

16. A non-transitory computer-readable storage medium including instructions that, when executed by at least one processor of a computing system, cause the computing system to perform operations comprising:
receiving identification information from a user;
based at least in part on the identification information and a machine learning model, determining a risk level of the user;
determining whether the user can be authenticated with an authentication platform based on the risk level; and
based on authentication of the user by the authentication platform, automatically enabling authentication of the user for accounts with a plurality of institutions maintaining protected data of the user in a plurality of secure networks by obtaining authentication information from at least one machine learning model in a system, the system comprising a plurality of machine learning models at a plurality of levels that provide authentication information, the system comprising a general machine learning model at a first level, machine learning models at a second level adapted to particular types of accounts, and machine learning models at a third level adapted to specific institutions for a particular type of account.

17. The non-transitory computer-readable storage medium of claim 16, wherein the determining a risk level for the user comprises:
generating an aggregate risk score based on a risk scoring technique; and
determining the risk level based on the aggregate risk score.

18. The non-transitory computer-readable storage medium of claim 17, wherein the generating an aggregate risk score based on a risk scoring technique comprises:
determining a score for a feature provided by a data source;
determining a weight for the feature, the weight generated by at least one of the machine learning model or a deterministic model;
combining the score for the feature and the weight for the feature to generate a component score for a term corresponding with the feature; and
aggregating component scores of terms corresponding to selected features to generate the aggregate risk score.

19. The non-transitory computer-readable storage medium of claim 18, wherein the weight generated by the machine learning model is reconfigured to fall within a predetermined range that constrains the values of the weight.

20. The non-transitory computer-readable storage medium of claim 18, wherein the selected features are selected by the authentication platform from information provided by at least one of a mobile network provider, the data source, and an agency that are separate from the authentication platform.

\* \* \* \* \*